United States Patent
Varney

(10) Patent No.: US 7,178,351 B2
(45) Date of Patent: Feb. 20, 2007

(54) HEAT EXCHANGER OPTIMIZATION PROCESS AND APPARATUS

(76) Inventor: Brian Wilson Varney, 11 Deerwood Rd. S.E., Calgary, Alberta (CA) T2J 6L2

(*) Notice: Subject to any disclaimer, the term of this patent is extended or adjusted under 35 U.S.C. 154(b) by 0 days.

(21) Appl. No.: 10/658,277

(22) Filed: Sep. 10, 2003

(65) Prior Publication Data

US 2005/0034467 A1 Feb. 17, 2005

(51) Int. Cl.
F25D 17/00 (2006.01)
F17C 9/02 (2006.01)
F25J 1/00 (2006.01)

(52) U.S. Cl. ............................. 62/178; 62/50.2; 62/611

(58) Field of Classification Search ................. 62/178, 62/179, 50.1, 50.2, 48.2, 611, 613; 137/13; 165/45

See application file for complete search history.

(56) References Cited

U.S. PATENT DOCUMENTS 4,921,399 A 5/1990 Lew ............................. 415/27
6,141,973 A * 11/2000 Whitmore ................... 62/51.2

OTHER PUBLICATIONS

David T. Parker, Darrell G. Carver, "Variable-Frequency Drives Yield Savings for Gas Processor", *Oil & Gas Journal*, vol. 92, Issue 42, Oct. 17, 1994, (copy from the internet, 6 pages).

"Energy Conservation Measures", downloaded from "http://gail.nic.in/oper.htm" (Gas Authority of India Ltd. website) on Jan. 11, 2000 (1 page).

* cited by examiner

*Primary Examiner*—Chen-Wen Jiang
(74) *Attorney, Agent, or Firm*—Anthony R. Lambert

(57) ABSTRACT

An electronic HEMD determines the optimum balance between gas cooling and heat exchanger pressure loss, for any given operating condition, and adjusts the gas flow rate through the exchanger accordingly, to yield the maximum net power savings (and thereby energy savings) afforded by the exchanger. Maintaining the optimum balance between cooling and exchanger pressure loss reduces the amount of energy required to transport a given volume of gas through a pipeline and thereby increases the transmission efficiency of the gas pipeline system. A method of operating a heat exchanger on a natural gas transmission pipeline using a control algorithm that in turn controls the position of a heat exchanger bypass valve. The current operating conditions of the upstream compressor and gas cooling system are continually monitored for any changes and the control algorithm determines, the optimum flow through the heat exchanger and initiates a command signal to the exchanger bypass valve operator to move the bypass valve and thereby increase or decrease the gas flow rate through the exchanger, as required, until the optimum balance between gas cooling and heat exchanger pressure loss has been achieved.

10 Claims, 18 Drawing Sheets

Fig. 1 Natural Gas Pipeline Schematic
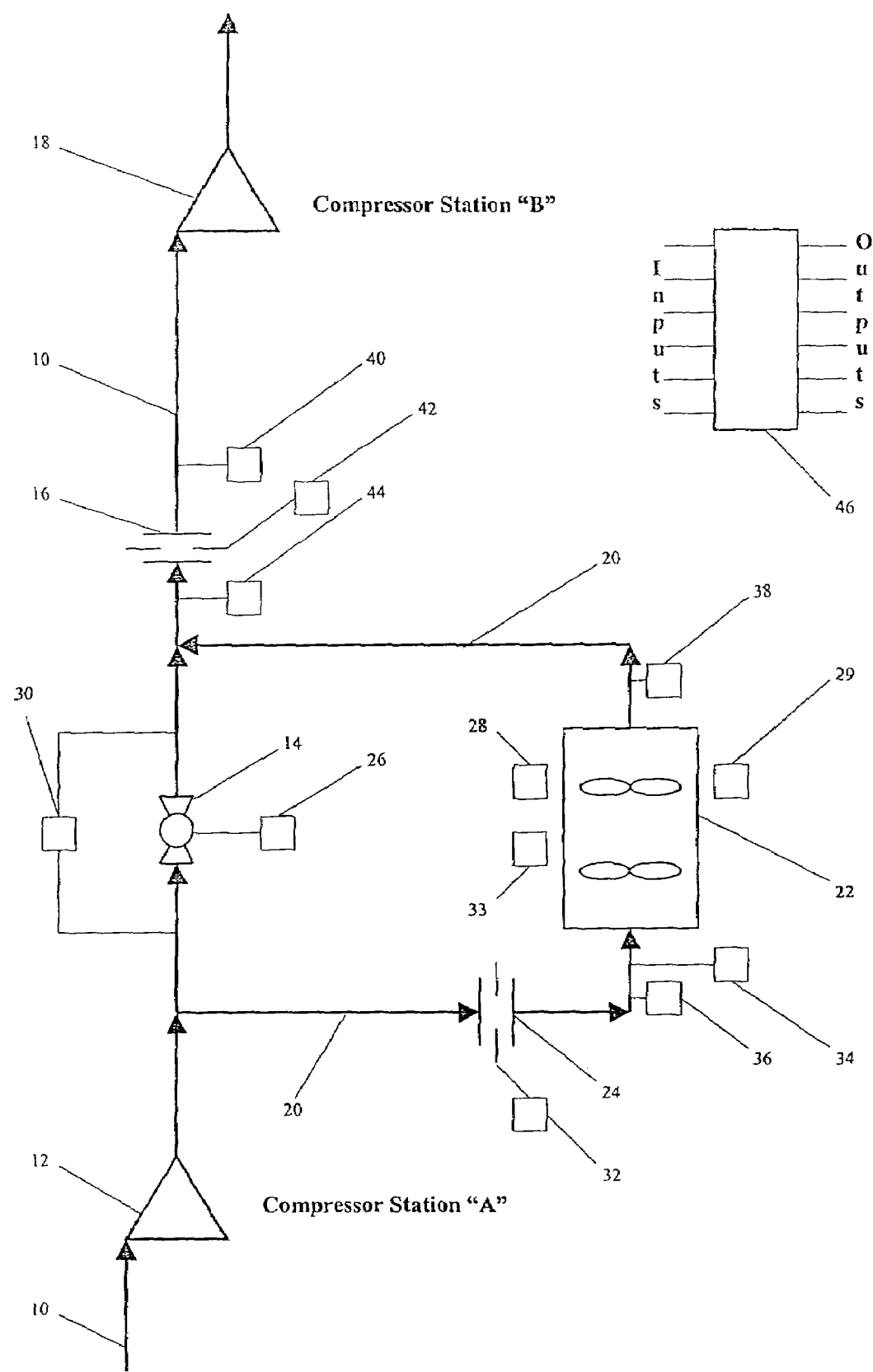

Fig. 2A Steps involved in Deriving the Control Algorithm – Part A
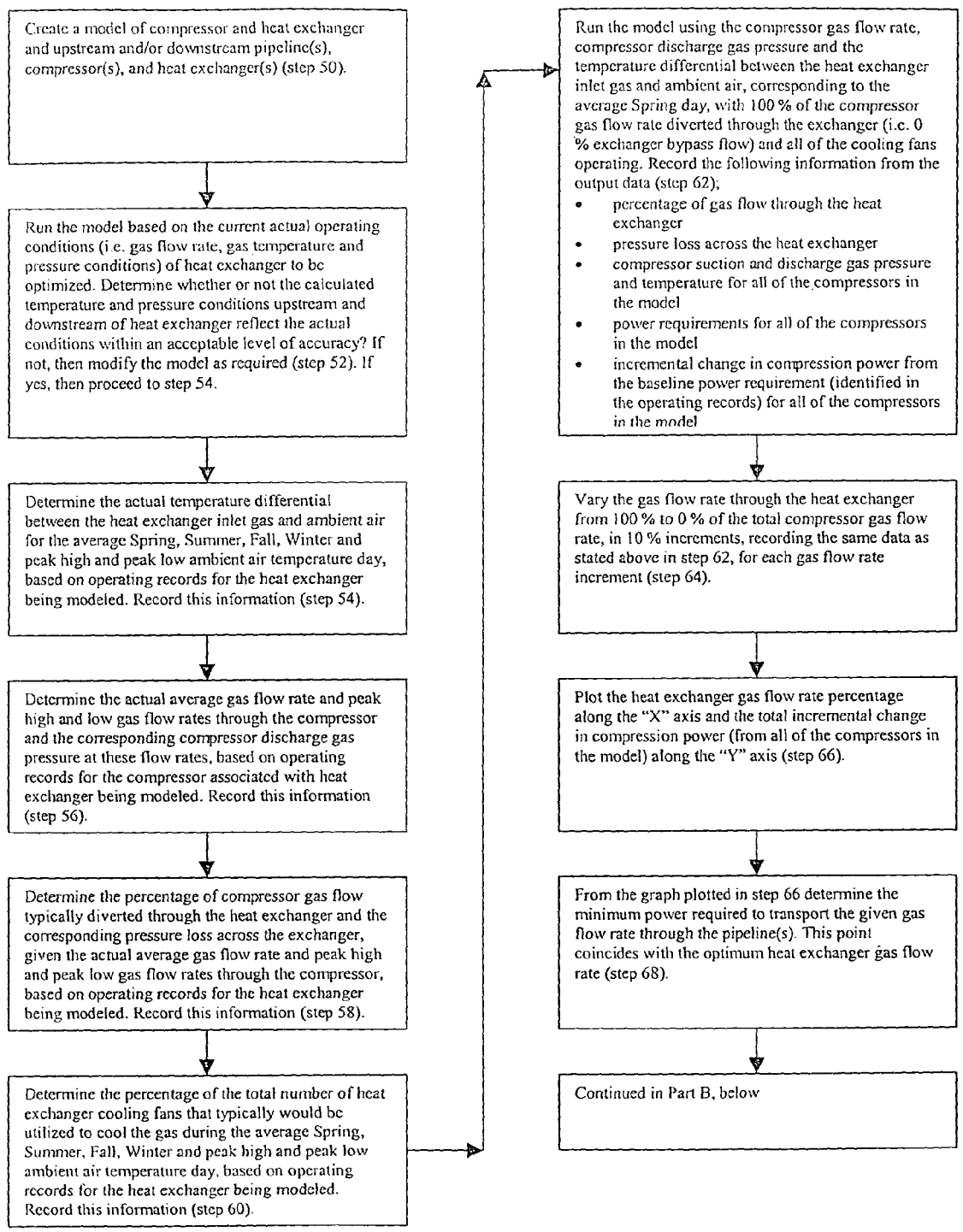

Fig. 2B Steps involved in Deriving the Control Algorithm – Part B
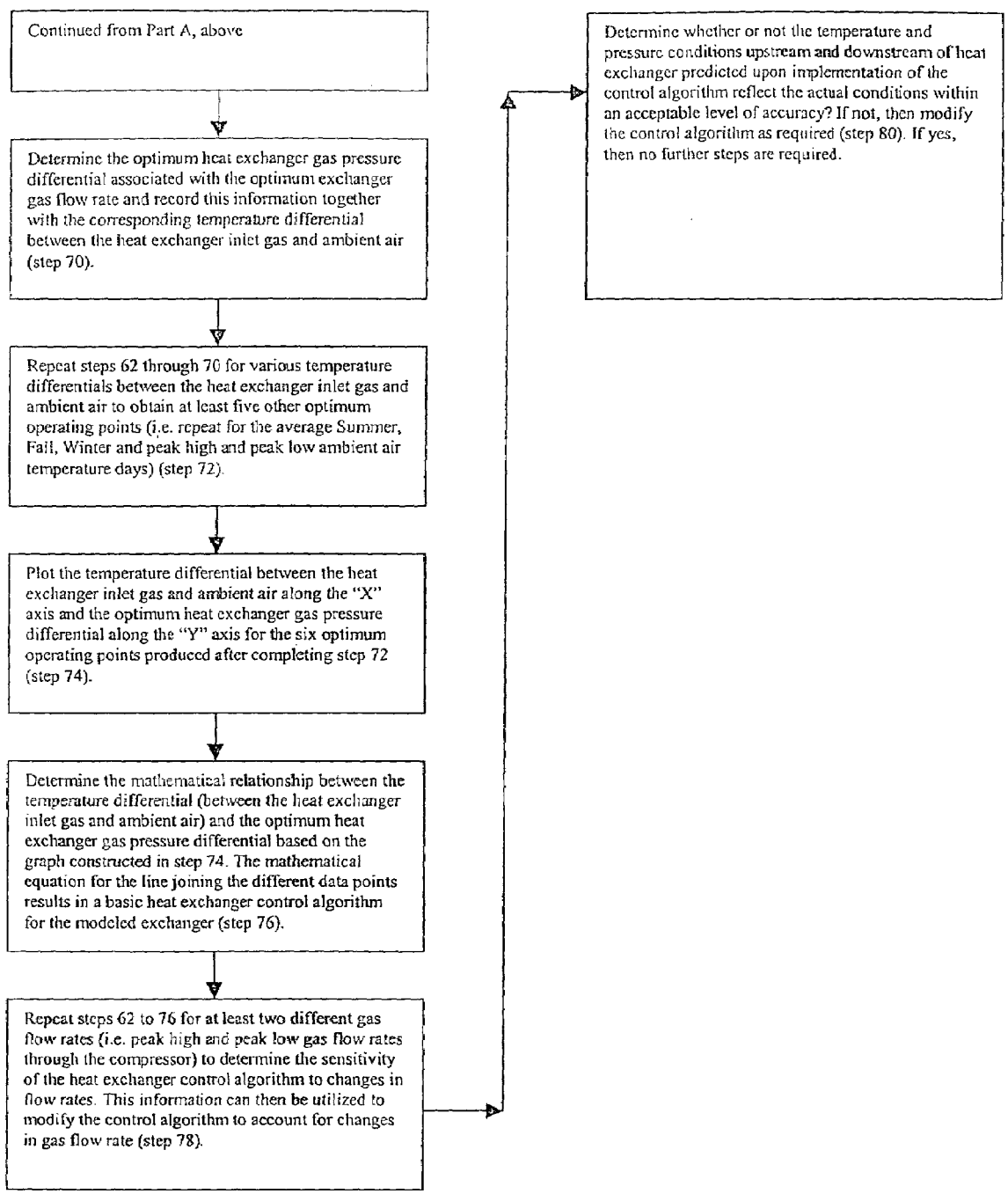

Fig. 3  Heat Exchanger Management Device Schematic – Embodiment One
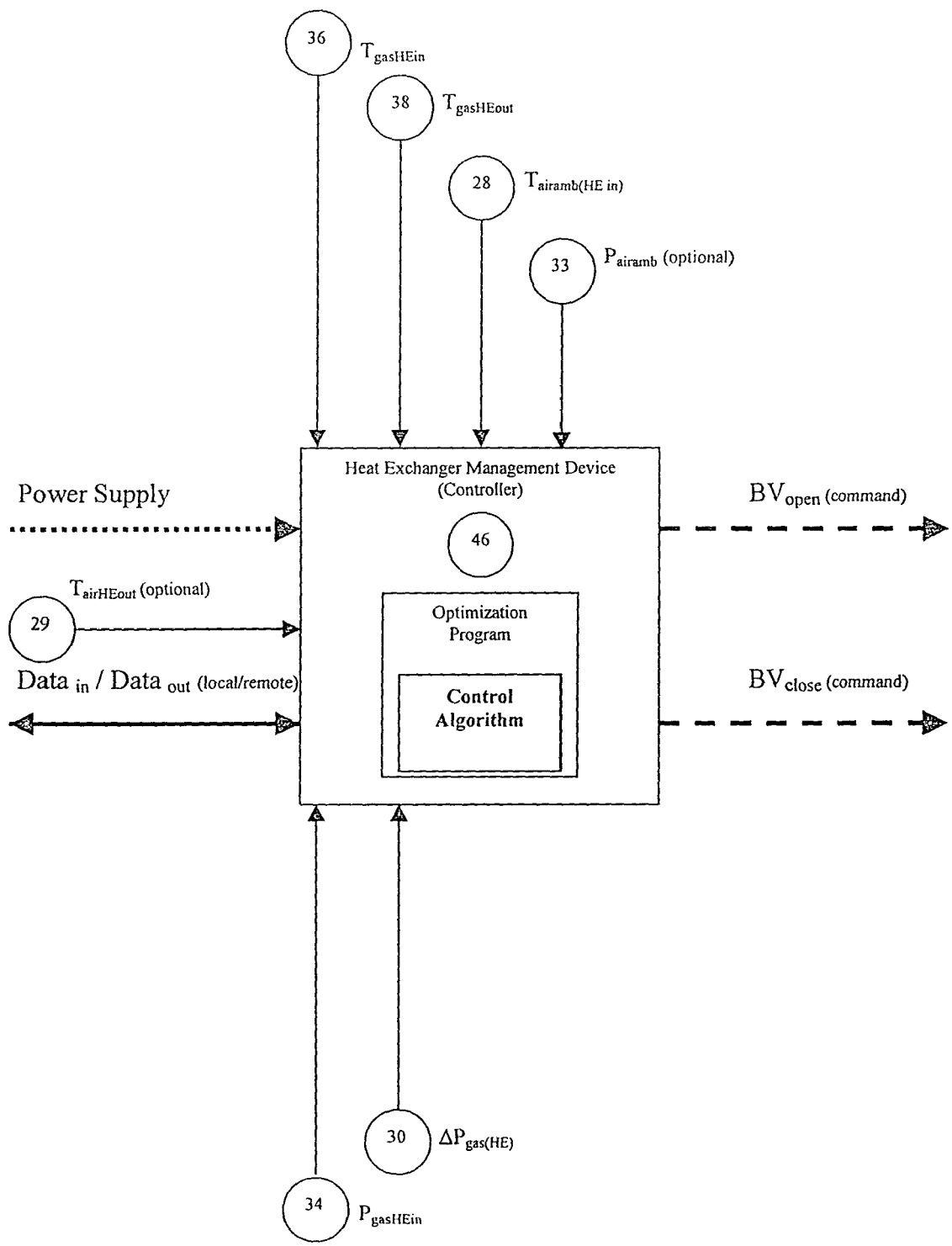

Fig. 4   Heat Exchanger Management Device Schematic – Embodiment Two
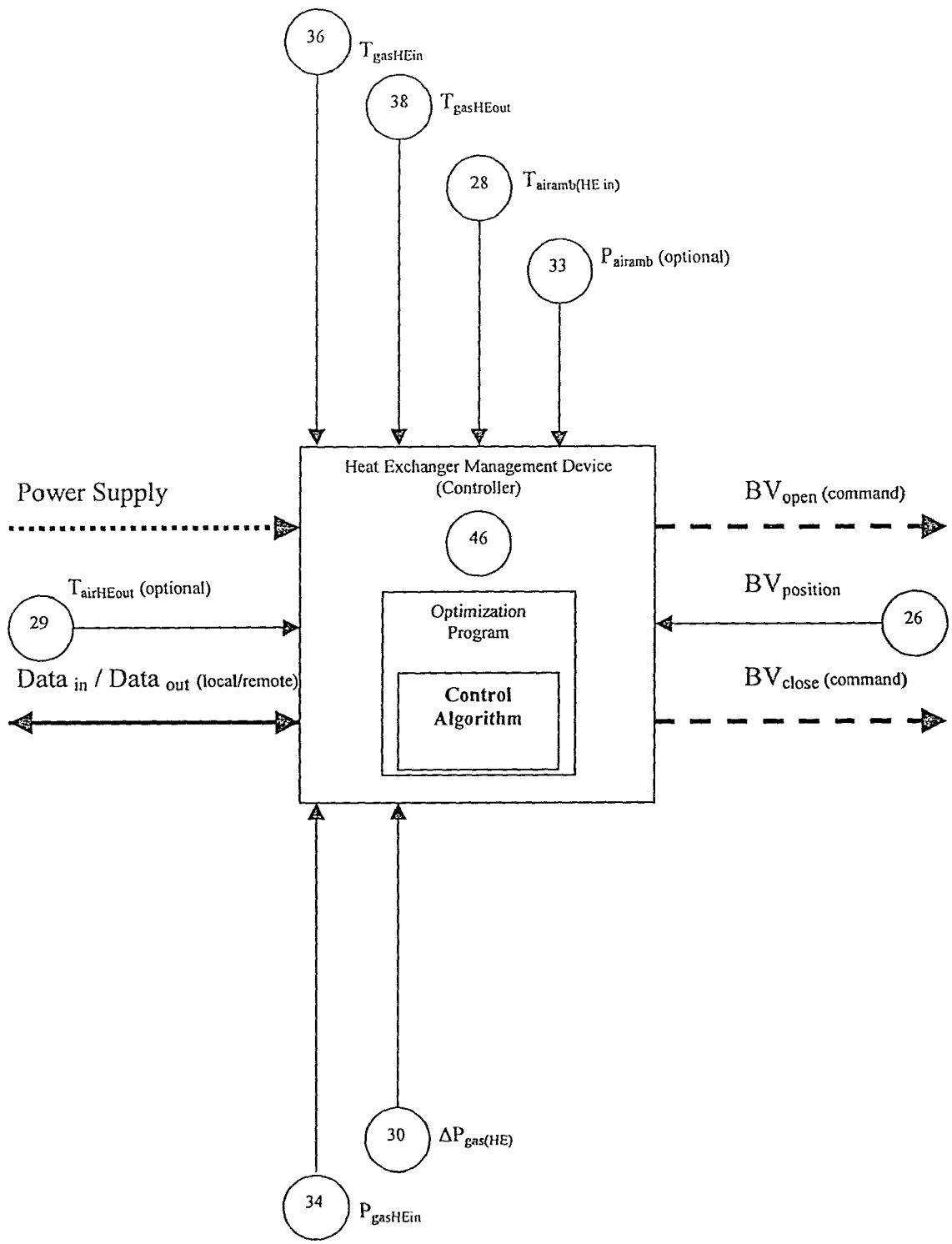

Fig. 5 Heat Exchanger Management Device Schematic – Embodiment Three
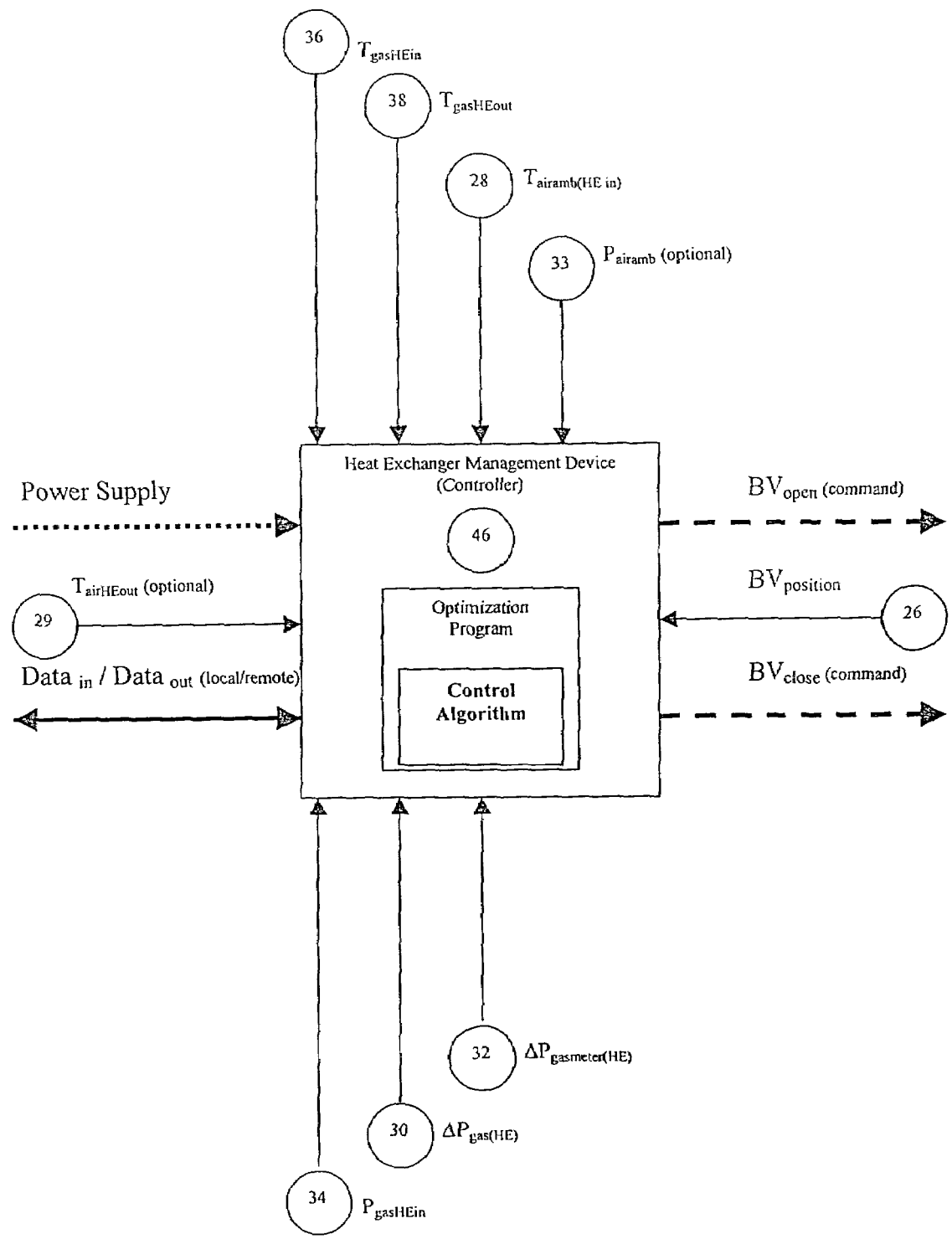

Fig. 6 Heat Exchanger Management Device Schematic – Embodiment Four
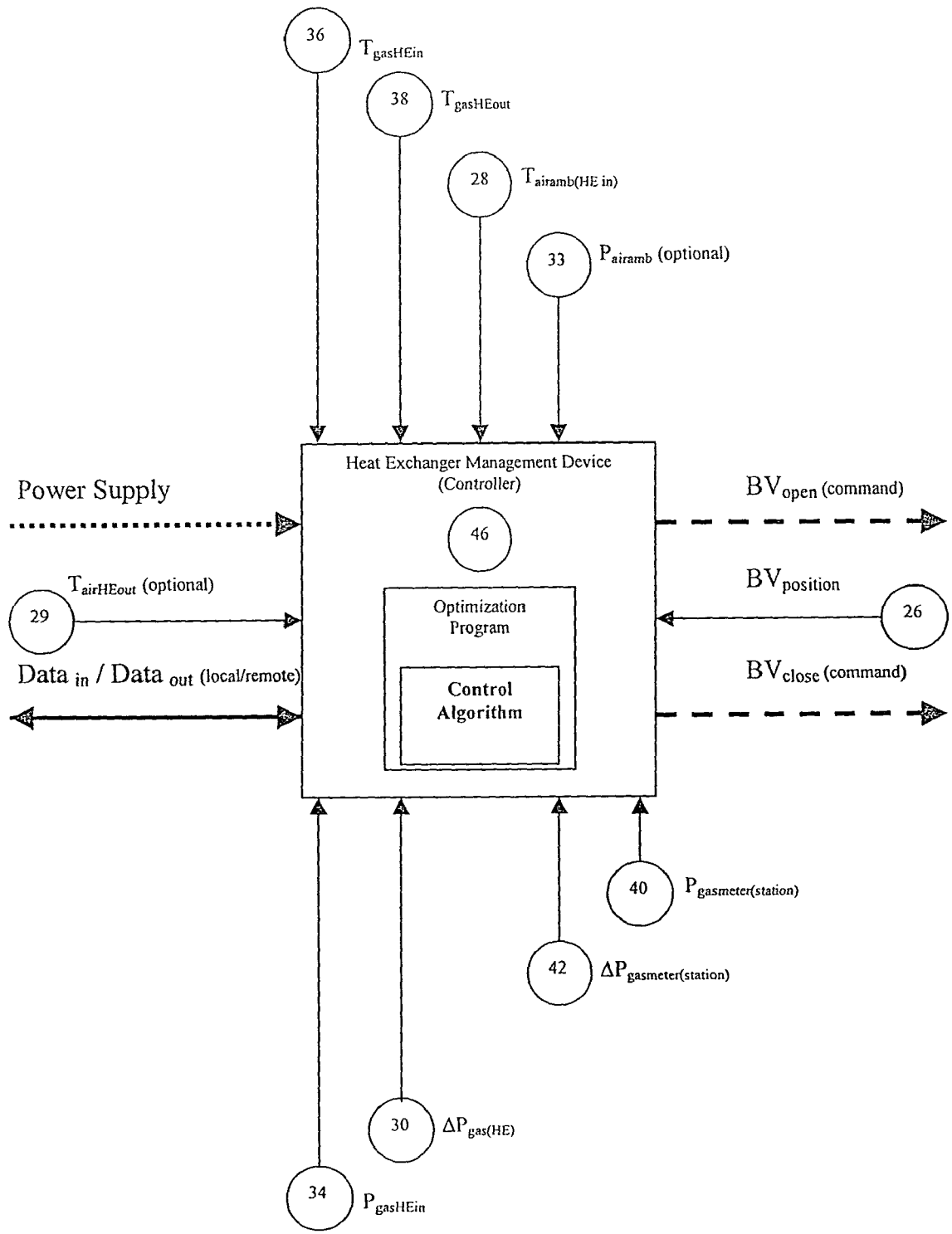

Fig. 7 Heat Exchanger Management Device Schematic – Embodiment Five
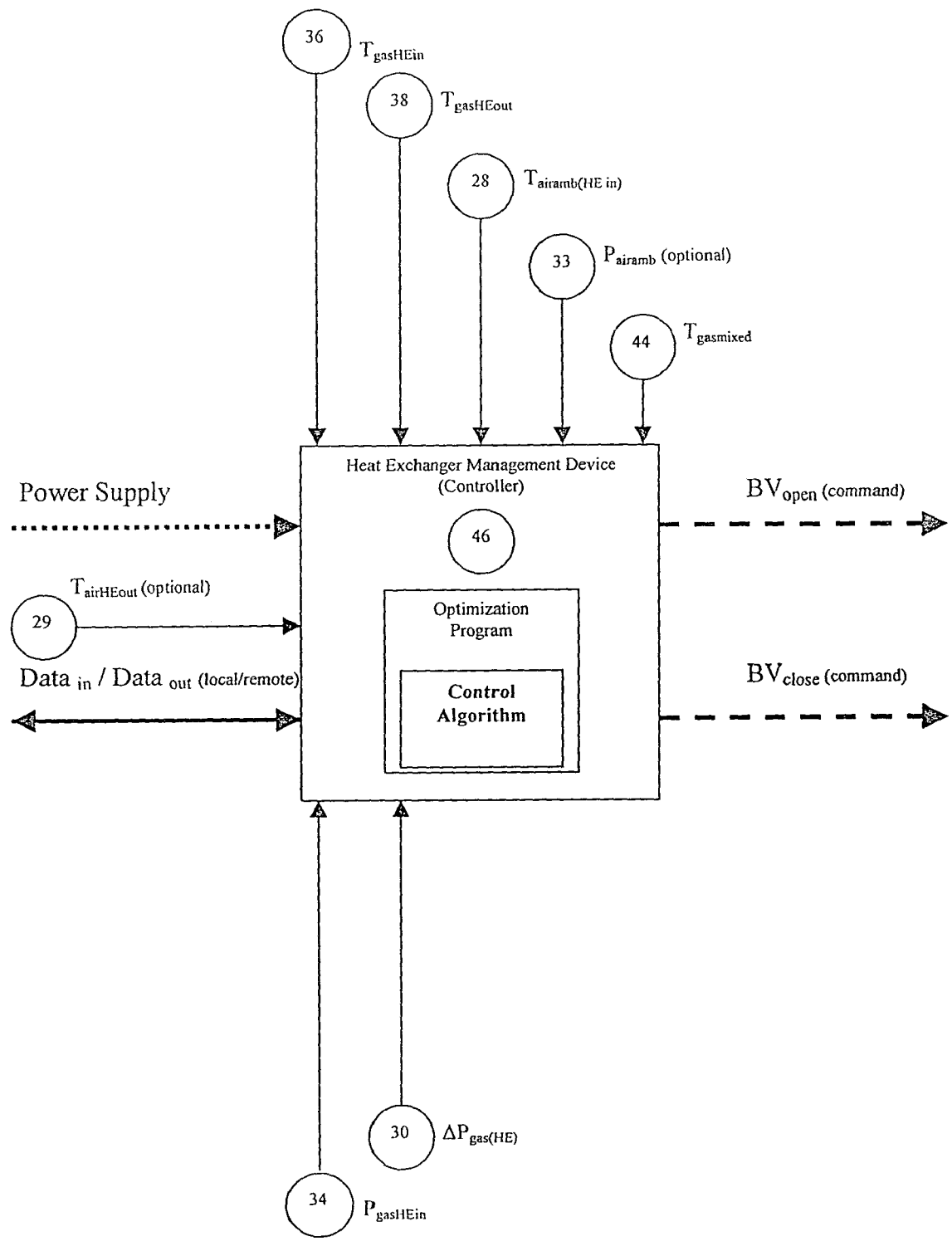

Fig. 8 Heat Exchanger Management Device Schematic – Embodiment Six
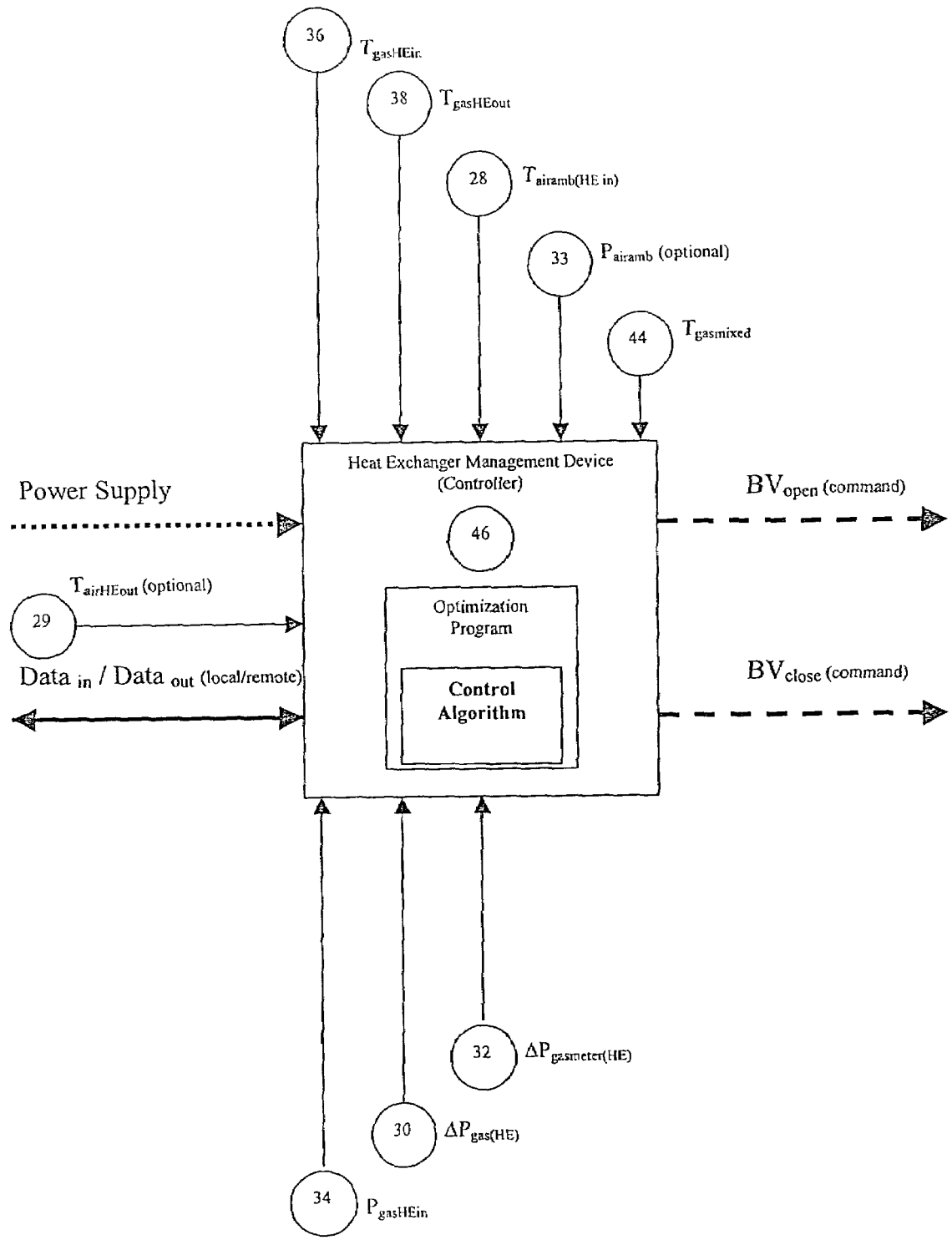

Fig. 9 Heat Exchanger Management Device Schematic – Embodiment Seven
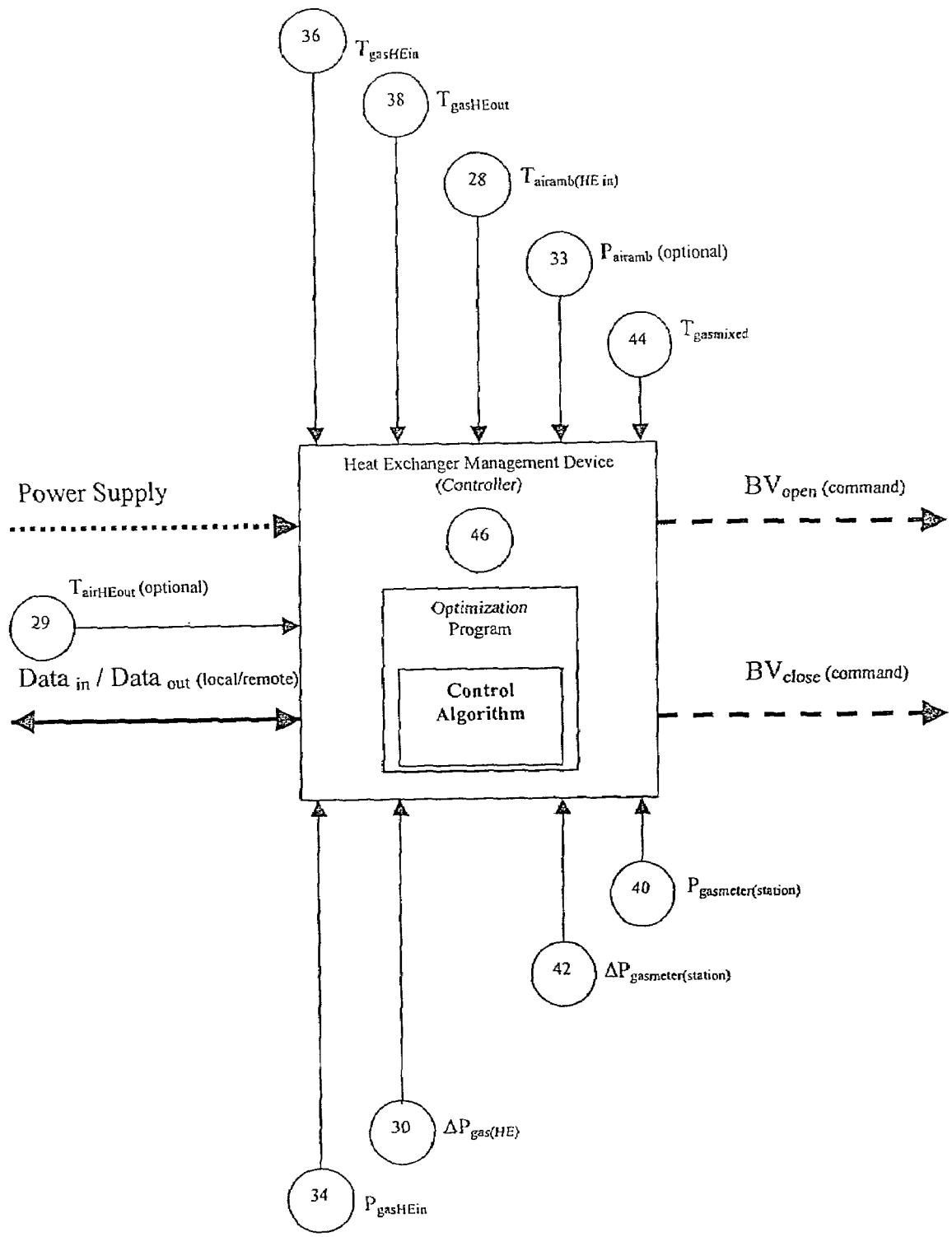

Fig. 10 Heat Exchanger Management Device Schematic – Embodiment Eight
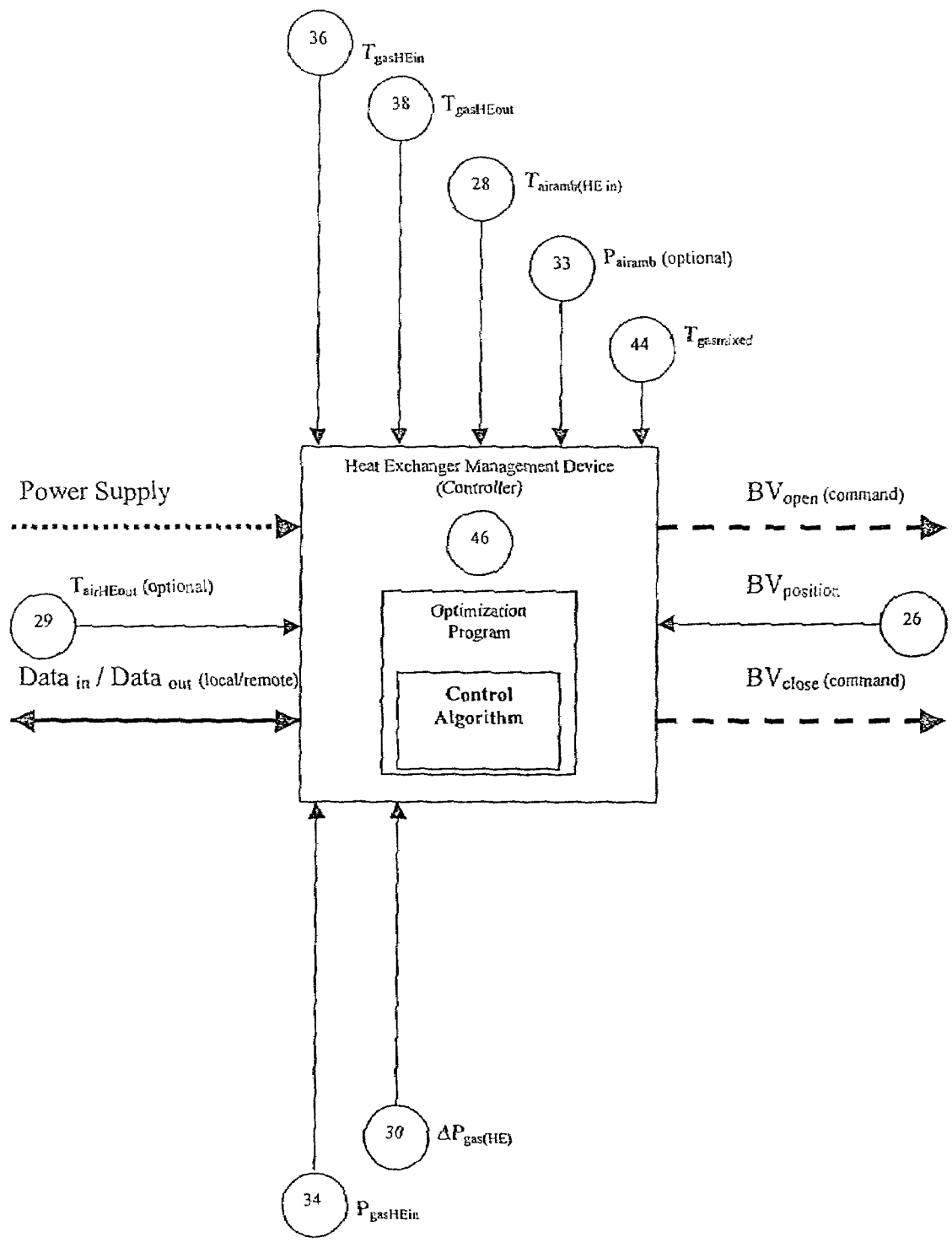

Fig. 11 Heat Exchanger Management Device Schematic – Embodiment Nine
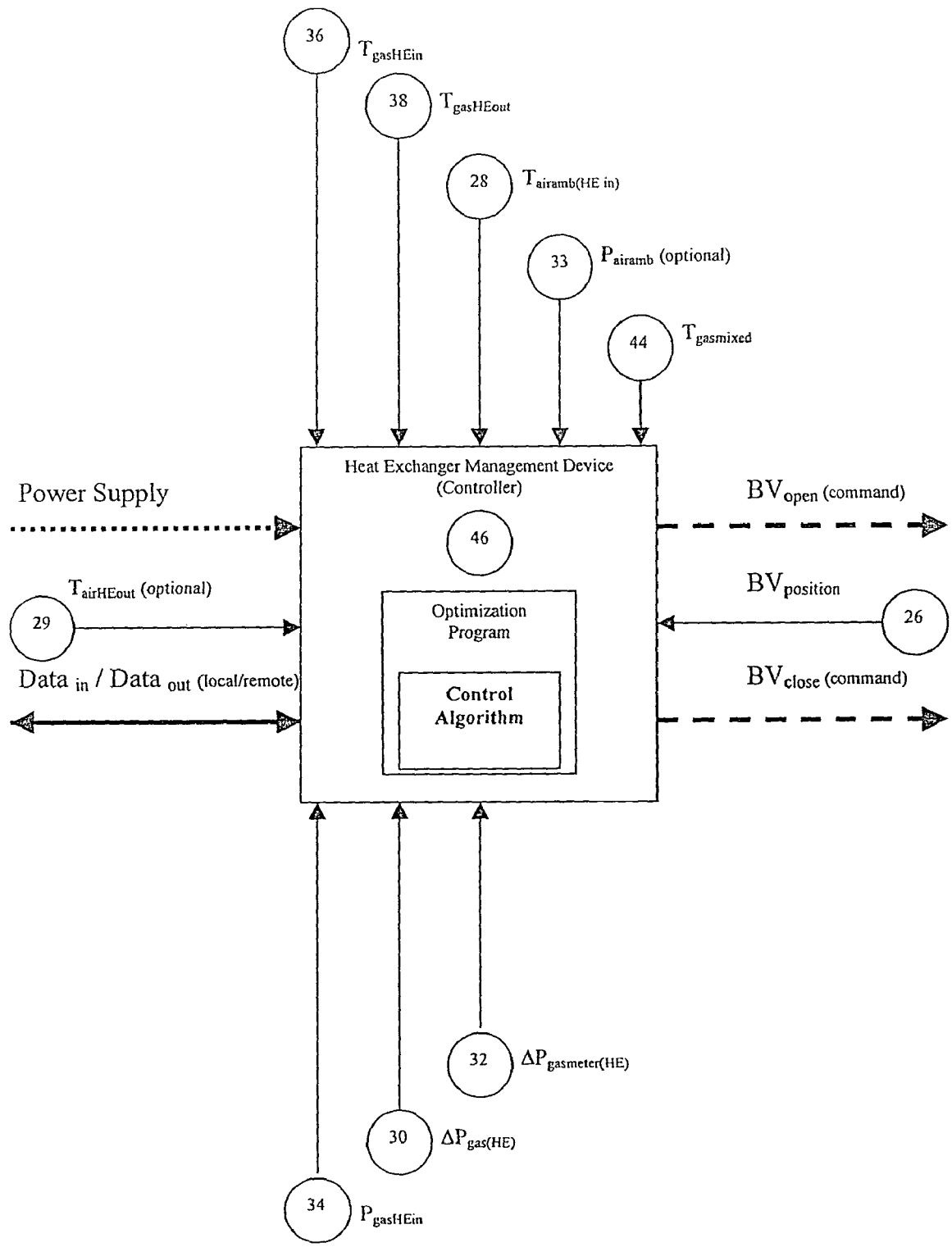

Fig. 12 Heat Exchanger Management Device Schematic – Embodiment Ten
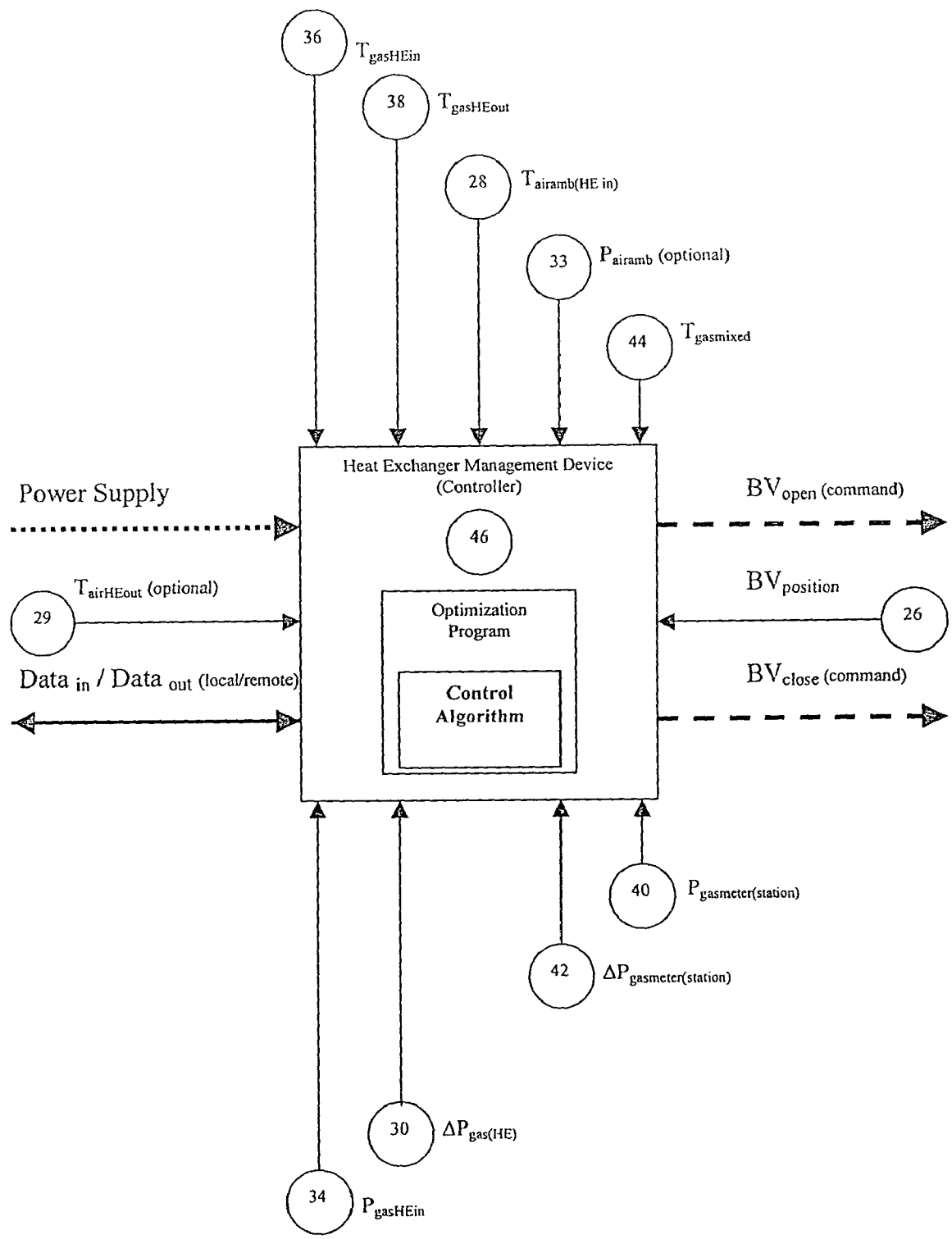

Fig. 13 Heat Exchanger Management Device Schematic – Embodiment Eleven
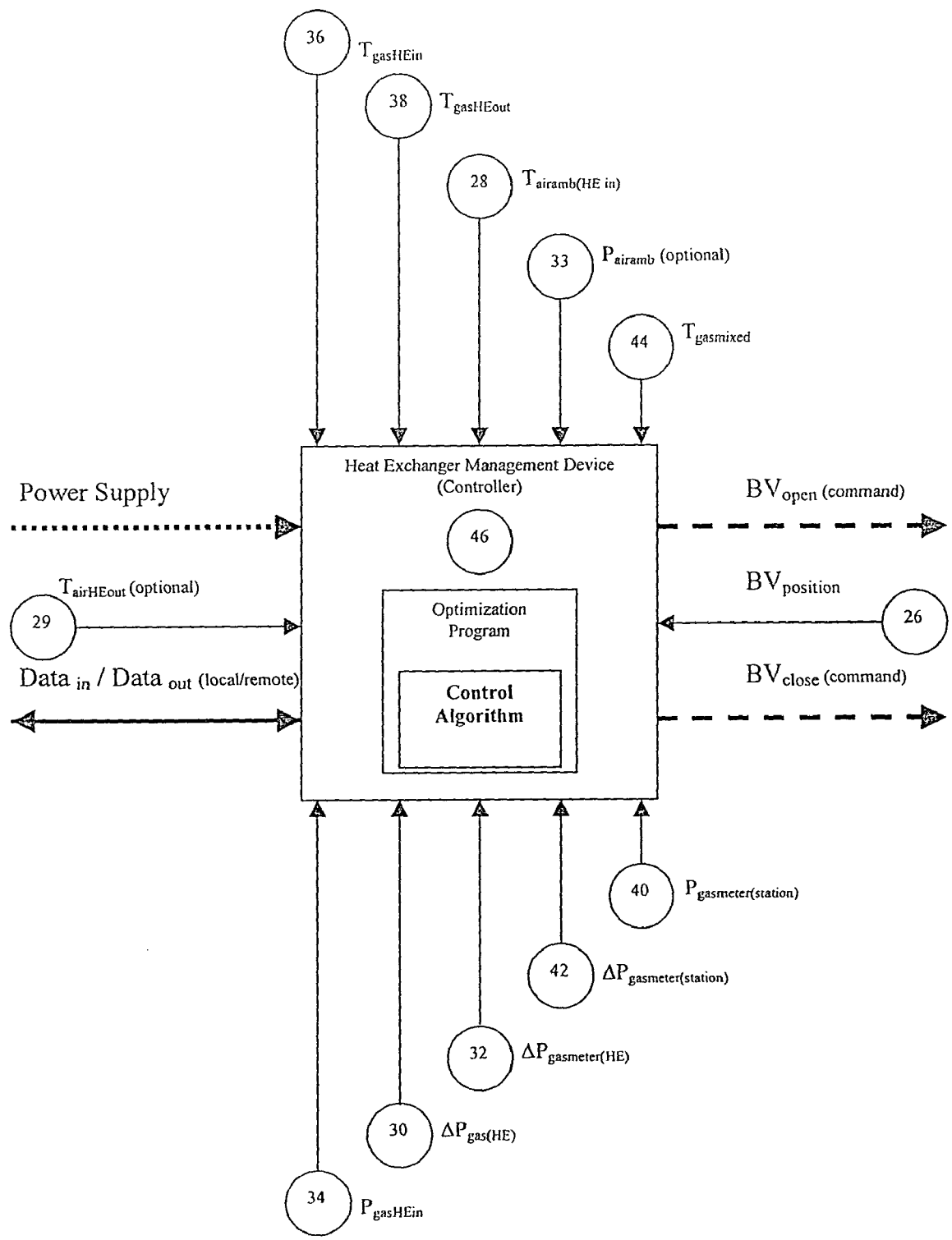

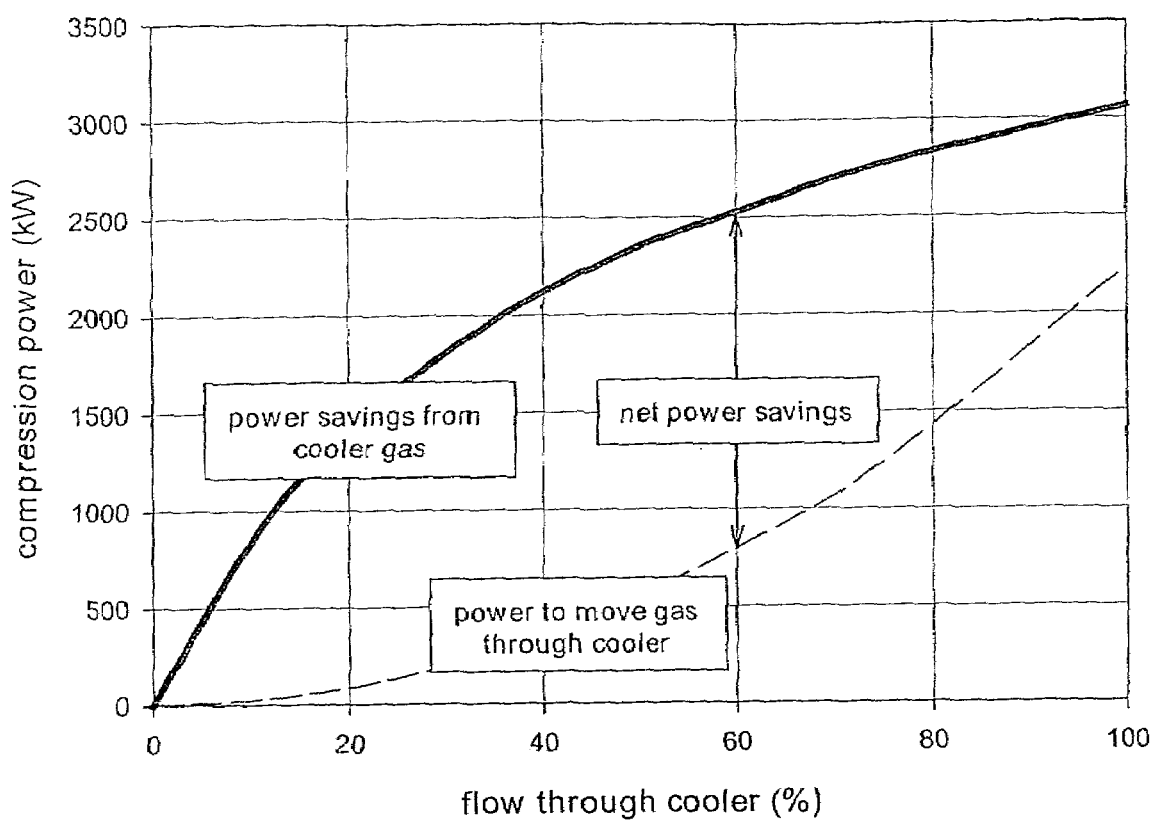
Fig. 14 Net Power Savings through Gas Cooling

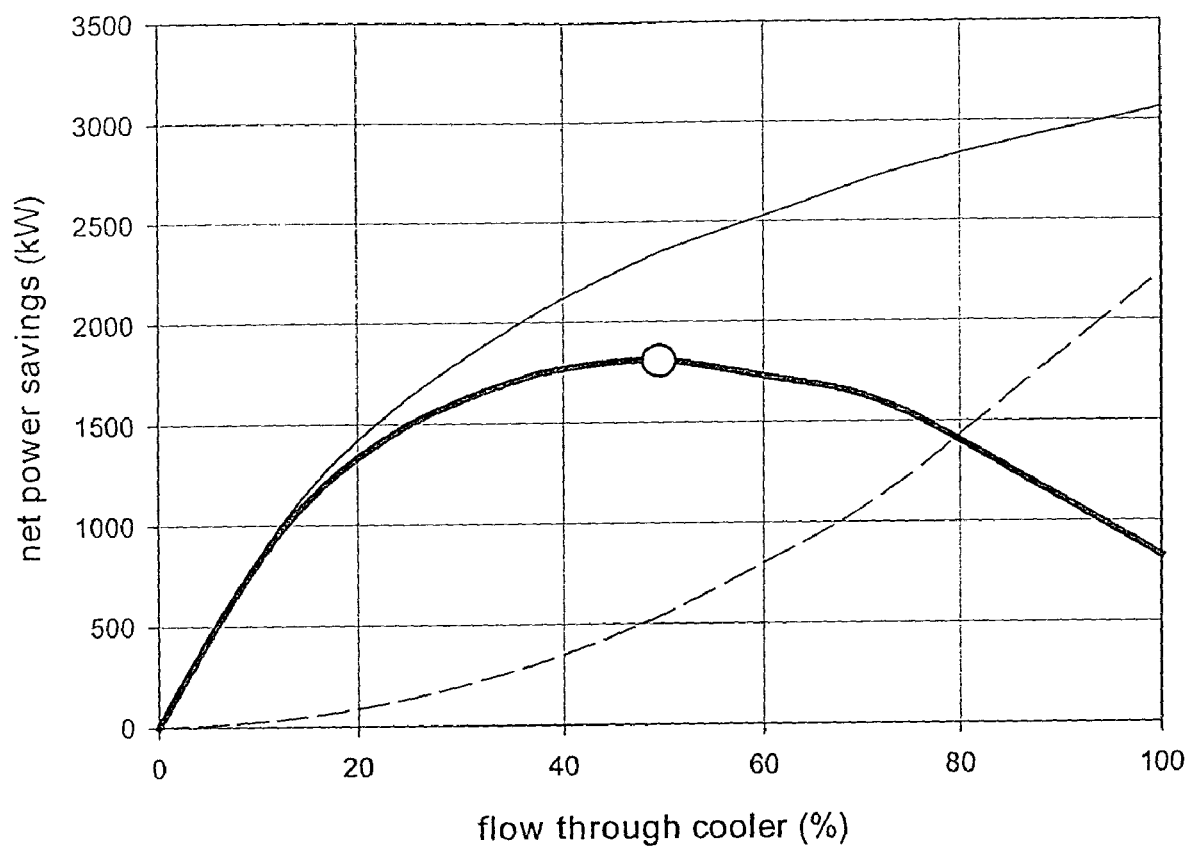
Fig. 15 Optimum Amount of Cooling

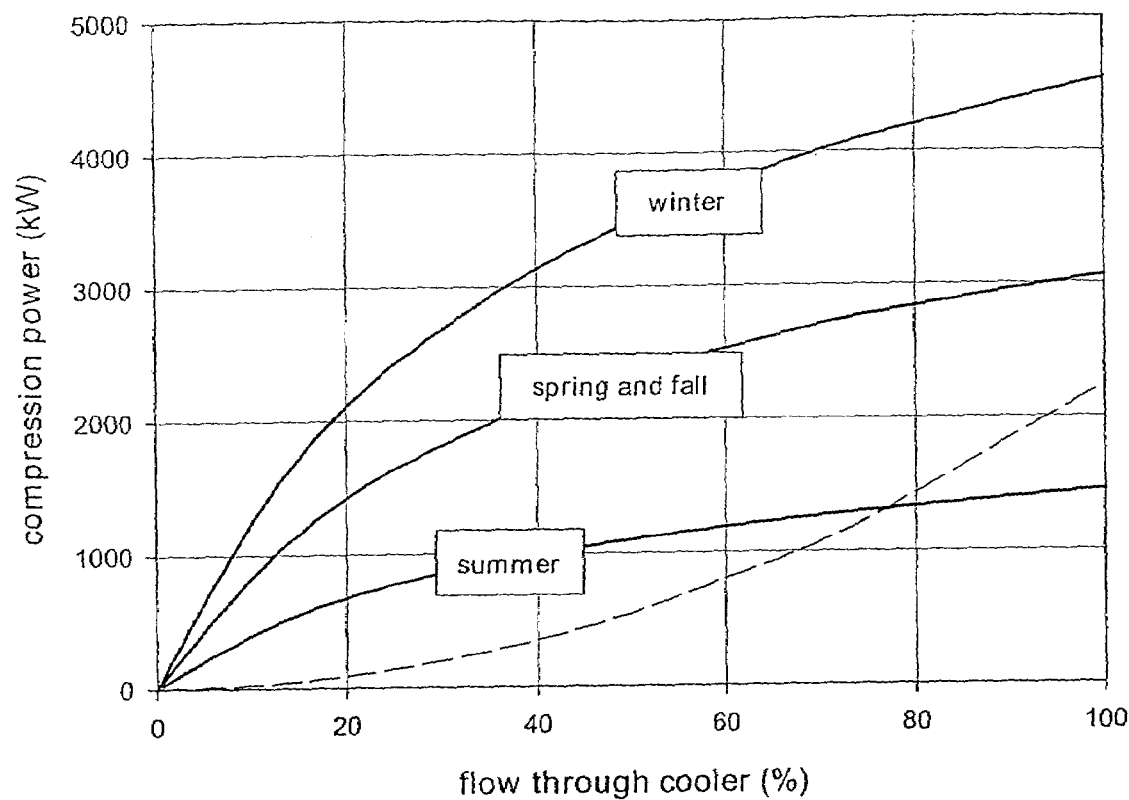
Fig. 16 Benefits of Cooling at Various Ambient Temperatures

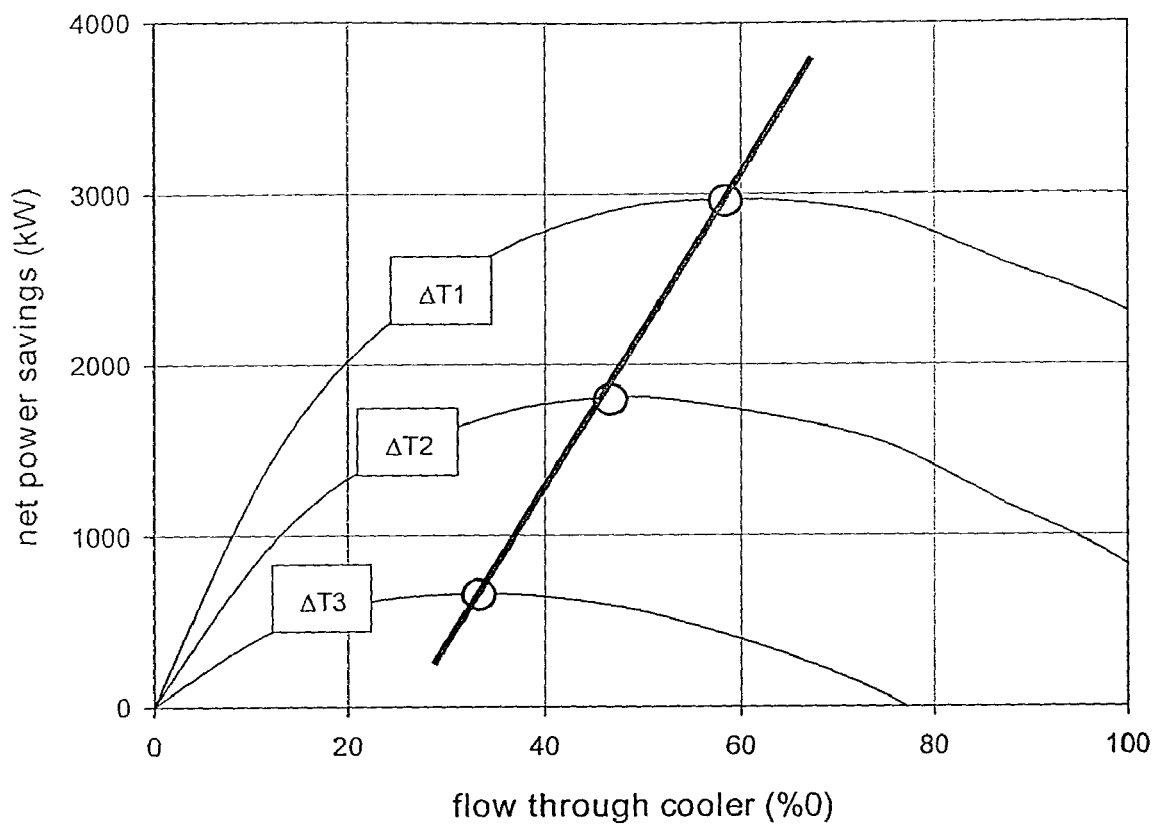
Fig. 17 Basis for the Control Algorithm

HEAT EXCHANGER OPTIMIZATION PROCESS AND APPARATUS

BACKGROUND OF THE INVENTION

The energy required to transport natural gas through a pipeline is stored in the form of gas pressure. Therefore as natural gas is transported along a pipeline it undergoes a pressure loss. For any given pipeline and gas flow rate, the magnitude of the pressure loss is primarily dependent upon the pressure and temperature of the gas flowing through the pipeline. The lower the natural gas pressure and/or higher the temperature, the greater the pipeline pressure loss, and vice versa.

In order to maximize natural gas throughput of a pipeline it is necessary to restore the pressure loss (i.e. energy consumed) that occurs as the natural gas travels down a pipeline, by compressing the gas at regular intervals along the pipeline. For any given compressor discharge gas pressure and gas flow rate, the power and thereby energy required to compress the gas is primarily dependent upon the compressor suction gas pressure and temperature (i.e. pipeline outlet gas pressure and temperature). The lower the suction gas pressure and/or higher the suction gas temperature, the greater the amount of power required to compress the natural gas, and vice versa.

However natural gas undergoes an increase in temperature during the compression process. Depending on the length of intervening piping/pipeline and surrounding soil conditions, elevated compressor station discharge gas temperatures (i.e. pipeline inlet gas temperatures) result in lower suction gas pressures and/or higher suction gas temperatures at the downstream compressor station. For any given gas flow rate this results in an increase in the amount of power required to compress the natural gas at the downstream compressor and thereby results in an increase in the amount of energy required to transport the gas through the pipeline.

Air cooled heat exchangers are utilized to lower the temperature of the natural gas to reduce compression power requirements and thereby reduce the amount of energy required to transport natural gas through a pipeline.

In the case of air cooled natural gas heat exchangers, heat transfer occurs between the warm gas and cool ambient air that is forced through the exchanger by powered fans. The amount by which the gas temperature is reduced is dependent upon heat exchanger design (i.e. total cooling surface area, and number, configuration, length and diameter of the cooling tubes, and overall heat transfer coefficient), heat exchanger inlet gas pressure and temperature, ambient air temperature, the specific heat capacity of the natural gas and air, and flow rate of the gas and air through the exchanger.

It is known in the art that the cooling of natural gas is sometimes not energy efficient and consequently, heat exchangers are often shut down and/or bypassed completely to avoid unnecessary energy costs. This invention provides an improvement upon prior art methods of optimizing energy savings during the operation of compressor stations and heat exchangers when transporting natural gas through pipelines.

SUMMARY OF THE INVENTION

The inventor has recognized that a pressure loss occurs as natural gas passes through a heat exchanger, which will offset the power and thereby energy savings afforded by cooling the gas. For any given inlet gas pressure and temperature, this pressure loss varies with the amount of gas flow through the heat exchanger.

An increase in gas flow rate through a heat exchanger results in greater heat transfer (i.e. greater cooling of the total gas flow coming from the upstream compressor), and vice versa. However an increase in gas flow rate also results in a greater pressure loss for the natural gas, and vice versa.

Given the manner in which the amount of heat transfer (i.e. cooling) and heat exchanger pressure loss varies with the amount of gas flow through the exchanger, there is, for any given heat exchanger design (i.e. total cooling surface area, and number, configuration, length and diameter of the cooling tubes, overall heat transfer coefficient, and cooling fan power requirement) and operating conditions (i.e. heat exchanger inlet gas pressure and temperature, ambient air temperature, specific heat capacity of the natural gas and air, total flow rate of natural gas from upstream compressor(s), and air flow rate through the heat exchanger), an optimum gas flow rate through the exchanger that yields the maximum net compression power (and thereby energy) savings.

There is therefore provided in accordance with an aspect of the invention, an electronic Heat Exchanger Management Device (HEMD) that determines the optimum balance between gas cooling and heat exchanger pressure loss, for any given operating condition. The HEMD then adjusts the gas flow rate through the exchanger accordingly, to yield the maximum net power (and thereby energy) savings obtainable from that exchanger. The HEMD can maintain the optimum balance between gas cooling and heat exchanger pressure loss and reduce the amount of energy required to transport a given volume of gas through a pipeline and thereby increase the transmission efficiency of the gas pipeline system.

According to a further aspect of the invention, there is provided a method of operating a heat exchanger on a natural gas transmission pipeline using a control algorithm. The control algorithm is the heart of the HEMD. The control algorithm is used to calculate the optimum position of the heat exchanger bypass valve to achieve the optimum gas flow rate through a exchanger based upon heat exchanger design (i.e. total cooling surface area, and number, configuration, length and diameter of the cooling tubes, overall heat transfer coefficient, and cooling fan power requirement) and operating conditions (i.e. heat exchanger inlet gas pressure and temperature, ambient air temperature, specific heat capacity of the natural gas and air, total flow rate of gas from upstream compressor(s), and air flow rate through the heat exchanger). The operating conditions of the heat exchanger and upstream compressor are continually monitored for any changes by the HEMD and the control algorithm is utilized to determine, among other things, the optimum flow through the heat exchanger and optimum position of the heat exchanger bypass valve, and to initiate a command signal to the bypass valve operator to change the position of the bypass valve, accordingly. Upon receipt of a command signal the bypass valve will then close or open and thereby increase or decrease the gas flow rate through the exchanger, as required. The command signal to the bypass valve operator will continue until the optimum balance between gas cooling and heat exchanger pressure loss (as calculated by the control algorithm) has been achieved and detected by the HEMD.

The control algorithm is derived through computer modeling of the heat exchanger, associated upstream and downstream compressors, and the intervening pipeline system(s). The model is used to determine the impact of incremental changes of flow through the exchanger on pipeline compression power requirements, based on a number of varying operating parameters (i.e. total flow rate of natural gas from the upstream compressor(s), air flow rate through the heat exchanger, heat exchanger inlet and outlet gas pressure and temperature, ambient air temperature, and power (and thereby energy) requirements of the upstream gas compressor and heat exchanger cooling fans). Where possible, the heat exchanger performance characteristics utilized in the model are based upon actual site measured parameters in order to improve the accuracy of the control algorithm. The results of this modeling form the basis for the control algorithm.

The resulting control algorithm takes into account the physical characteristics of the actual upstream and downstream compressors (i.e. compressor power requirement, performance and efficiency), the intervening pipeline systems (i.e. pipeline size, length, surrounding soil conditions, and heat conductivity) and heat exchanger design (i.e. total cooling surface area, and number, configuration, length and diameter of the cooling tubes, cooling air flow capacity, and overall heat transfer coefficient) and is therefore unique to each heat exchanger installation. The control algorithm also takes into account the current operating conditions of the heat exchanger (i.e. heat exchanger inlet and outlet gas pressure and temperature, ambient air temperature, the specific heat capacity of the natural gas and air, and air flow rate through the heat exchanger) and the upstream compressor(s) (i.e. total gas flow rate, discharge gas pressure and temperature). The control algorithm can among other things define the relationship between the temperature differential between the heat exchanger inlet gas and ambient air, and the pressure loss across the exchanger, that yields the optimum gas flow rate through the exchanger and thus the maximum net power (and thereby energy) savings.

According to a further aspect of the invention, given the manner in which the control algorithm is derived, it can be utilized to compare current (i.e. real time) actual heat exchanger performance to predicted performance criteria (based on actual site measured baseline parameters). As a result the HEMD can among other things, be utilized to monitor the extent of internal or external exchanger fouling (i.e. heat exchanger performance) and to determine if and when the exchanger may require cleaning/de-fouling.

BRIEF DESCRIPTION OF THE FIGURES

There will now be described preferred embodiments of the invention, with references to the figures by way of illustration, in which like reference characters denote like elements, and in which:

FIG. 1 is a schematic showing a natural gas pipeline with an upstream compressor station "A", heat exchanger and downstream compressor station "B";

FIG. 2A and 2B is a flow diagram illustrating method steps according to the invention;

FIG. 3 is a schematic showing inputs and outputs of a first embodiment of a heat exchanger management device according to the invention;

FIG. 4 is a schematic showing inputs and outputs of a second embodiment of a heat exchanger management device according to the invention;

FIG. 5 is a schematic showing inputs and outputs of a third embodiment of a heat exchanger management device according to the invention;

FIG. 6 is a schematic showing inputs and outputs of a fourth embodiment of a heat exchanger management device according to the invention;

FIG. 7 is a schematic showing inputs and outputs of a fifth embodiment of a heat exchanger management device according to the invention;

FIG. 8 is a schematic showing inputs and outputs of a sixth embodiment of a heat exchanger management device according to the invention;

FIG. 9 is a schematic showing inputs and outputs of a seventh embodiment of a heat exchanger management device according to the invention;

FIG. 10 is a schematic showing inputs and outputs of a eighth embodiment of a heat exchanger management device according to the invention;

FIG. 11 is a schematic showing inputs and outputs of a ninth embodiment of a heat exchanger management device according to the invention;

FIG. 12 is a schematic showing inputs and outputs of a tenth embodiment of a heat exchanger management device according to the invention;

FIG. 13 is a schematic showing inputs and outputs of a eleventh embodiment of a heat exchanger management device according to the invention;

FIG. 14 is a graph showing net power savings through cooling by use of a method and apparatus according to the invention;

FIG. 15 is a graph showing optimum amount of cooling obtained by operation of a method and apparatus according to the invention;

FIG. 16 is a graph showing benefits of cooling at various ambient temperatures from operation of a method and apparatus according to the invention; and FIG. 17 is a graph illustrating the basis for the control algorithm for optimizing power (and thereby energy savings), based on various temperature differentials between the heat exchanger inlet gas and ambient air, for a given gas flow rate.

DETAILED DESCRIPTION OF PREFERRED EMBODIMENTS OF THE INVENTION

In this patent document, the word comprising is used in its inclusive sense and does not exclude other elements being present. The indefinite article "a" before an element does not exclude other elements being present.

The energy required to transport natural gas through a pipeline is stored in the form of gas pressure. Therefore as natural gas is transported along a pipeline it undergoes a pressure loss. The relationship of gas mass flow rate, pipeline inlet gas pressure and temperature to pipeline pressure loss can be defined as follows (based on the AGA Equation for pipeline pressure loss given fully turbulent pipeline flow);

$$\Delta P_{gaspipe} = P_{gasinlet} - \left( P_{gasinlet}^2 - \left[ \frac{(m_{gaspipe})^2 * (T_{gasinlet} + T_{gasoutlet}) * (z_{gasinlet} + z_{gasoutlet})}{\left[ 2.0615 * \left[ \frac{T_{gasstd}}{P_{gasstd}} \right] * \left[ \frac{SG_{gas}}{L_{pipe}} \right]^{0.5} * \right]^2} \right]^{0.5} \right)$$

Given that standard pressure and temperature conditions, and pipeline length, relative roughness and diameter and natural gas specific gravity are constants then the impact of changing gas mass flow rate, pipeline inlet gas pressure and temperature to pipeline pressure loss can be defined as follows;

$$\Delta P_{gaspipenew} = P_{gasinletnew} -$$

$$(P_{gasinletold}^2 - P_{gasoutletold}^2) * \left(\frac{m_{gaspipenew}}{m_{gaspipeold}}\right)^2 * \left(\frac{\left(\frac{T_{gasinletnew} + T_{gasoutletnew}}{T_{gasinletold} + T_{gasoutletold}}\right) *}{\left(\frac{z_{gasinletnew} + z_{gasoutletnew}}{z_{gasinletold} + z_{gasoutletold}}\right)}\right)^{0.5}$$

A decrease in pipeline inlet natural gas pressure will result in an increase in pipeline pressure loss, and vice versa. Assuming that the gas mass flow rate, gas temperature and gas compressibility are essentially constant, it can be shown that lowering the gas pressure at the inlet of the pipeline by a given amount will result in an increase in pipeline pressure loss, as follows;

$$\Delta P_{gaspipenew} = P_{ga\,sin\,letnew} - (P_{ga\,sin\,letnew}^2 - P_{ga\,sin\,letold}^2 + P_{gasoutletold}^2)^{0.5}$$

An increase in pipeline inlet natural gas temperature will increase pipeline pressure loss, and vice versa. Assuming that pipeline inlet gas pressure, gas mass flow rate and gas compressibility are essentially fixed, it can be shown that the amount of pipeline pressure loss is dependent upon the temperature of the gas flowing through the pipeline, as follows;

$$\Delta P_{gaspipenew} = P_{gasinletnew} -$$

$$\left(P_{gasinletnew}^2 - \left[(P_{gasinletold}^2 - P_{gasoutletold}^2) * \left(\frac{T_{gasinletnew} + T_{gasoutletnew}}{T_{gasinletold} + T_{gasoutletold}}\right)\right]\right)^{0.5}$$

In order to maximize the natural gas throughput of a pipeline it is necessary to restore the pressure loss (i.e. energy consumed) that occurs as gas travels through a pipeline by compressing the gas at regular intervals along the pipeline. The power required to compress gas is a function of compressor gas mass flow rate, compressor efficiency, compressor suction gas pressure and temperature, discharge gas pressure, and gas composition/characteristics (i.e. adiabatic exponent, compressibility, and molecular weight), as follows;

$$Pwr_{comp} = \frac{n\&_{gascomp}}{\eta_{old}} * \frac{k_{adgas}}{(k_{adgas} - 1)} * \left[\frac{z_{gascompsuc} + z_{gascompdis}}{2}\right] *$$

$$\frac{R}{MW_{gas}} * T_{gascompsuc} * \left[\left(\frac{P_{gascomdis}}{P_{gascompsuc}}\right)^{[(k_{adgas}-1)/k_{adgas}]} - 1\right]$$

A decrease in suction gas pressure and/or increase in discharge gas pressure will result in an increase in the amount of power required for compression, and vice versa. Assuming that natural gas mass flow rate, compressor efficiency, and gas composition/characteristics (i.e. adiabatic exponent, compressibility, and molecular weight) and suction gas temperature are essentially fixed, it can be shown that the amount of compression power required is dependent upon suction and discharge gas pressure, as follows;

$$Pwr_{compnew} = Pwr_{compold} * \left(\frac{\left(\frac{P_{gascompdisnew}}{P_{gascompsucnew}}\right)^{[(k_{adgas}-1)/k_{adgas}]} - 1}{\left(\frac{P_{gascompdisold}}{P_{gascompsucold}}\right)^{[(k_{adgas}-1)/k_{adgas}]} - 1}\right)$$

An increase in the compressor suction gas temperature will result in an increase in the amount of power required for compression, and vice versa. Assuming that natural gas mass flow rate, compressor efficiency, and gas composition/characteristics (i.e. adiabatic exponent, compressibility, and molecular weight) and suction and discharge gas pressure are essentially fixed, it can be shown that the amount of compression power required is dependent upon suction gas temperature, as follows;

$$Pwr_{compnew} = Pwr_{compold} * \left(\frac{T_{gascompsucnew}}{T_{gascompsucold}}\right)$$

Gas undergoes an increase in temperature during the compression process, as follows;

$$T_{gascompdis} = T_{gascompsuc} + \Delta T_{gascomp}$$

where $$\Delta T_{gascomp} = \left[\frac{T_{gascompsuc}}{\eta_{ad}}\right] * \left[\left(\frac{P_{gascompdis}}{P_{gascompsuc}}\right)^{[(k_{adgas}-1)/k_{adgas}]} - 1\right]$$

A decrease in suction gas pressure and/or increase in discharge gas pressure will result in a higher compressor discharge gas temperature and thereby a higher downstream pipeline inlet gas temperature, and vice versa. Assuming that compressor efficiency, natural gas composition/characteristics (i.e. adiabatic exponent) and suction gas temperature are essentially fixed, then it can be shown that compressor discharge gas temperature is dependent upon suction and discharge gas pressure, as follows:

$$\Delta T_{gascompnew} = \Delta T_{gascompold} * \left(\frac{\left(\frac{P_{gascompdisnew}}{P_{gascompsucnew}}\right)^{[(k_{adgas}-1)/k_{adgas}]} - 1}{\left(\frac{P_{gascompdisold}}{P_{gascompsucold}}\right)^{[(k_{adgas}-1)/k_{adgas}]} - 1}\right)$$

An increase in suction gas temperature will result in a higher compressor discharge gas temperature and thereby a higher downstream pipeline inlet gas temperature, and vice versa. Assuming that compressor efficiency, natural gas composition/characteristics (i.e. adiabatic exponent) and suction and discharge gas pressure are essentially fixed, then it can be shown that compressor discharge gas temperature is dependent upon suction gas temperature, as follows;

$$\Delta T_{gascompnew} = \Delta T_{gascompold} * \left(\frac{T_{gascompsucnew}}{T_{gascompsucold}}\right)$$

Air cooled gas heat exchangers are utilized to lower the temperature of the compressor discharge gas as a means to reduce compression power and thereby energy requirements.

In the case of air cooled natural gas heat exchangers, heat transfer occurs between the warm natural gas and cool ambient air that is forced through the exchanger by powered fans. The amount by which the gas temperature is reduced is dependent upon heat exchanger design (i.e. total cooling surface area, and number, configuration, length and diameter of the cooling tubes, cooling air flow capacity, and overall heat transfer coefficient), heat exchanger inlet gas pressure and temperature, ambient air temperature, the specific heat capacity of the natural gas and air, mass flow rate of the gas and air through the exchanger.

The heat transfer to the air equals;

$$q_{air} = m\&_{airHE} * c_{pair} * (T_{airHEout} - T_{airamb(HEin)})$$

which equals the heat transfer from the gas;

$$q_{gas} = m\&_{gasHE} * c_{pgas} * (T_{gasHEin} - T_{gasHEout})$$

However the actual amount of heat transfer that occurs between the natural gas and air is a function of the physical characteristics of the heat exchanger being utilized. Heat transfer by a heat exchanger can be defined as follows;

$$q_{HE} = U_{HE} * A_{HEext} * F * LMTD$$

where $$U_{HE} = \left[ 1000 * \left[ \left( \frac{1}{\frac{d_{tube}}{D_{tube}} * h_{gas}} \right) + \left( \frac{1}{2 * \frac{k_{tube}}{D_{tube}}} * \ln \frac{D_{tube}}{d_{tube}} \right) + \left( \frac{1}{h_{air}} \right) + (A_{HEest} * R_{fouling}) \right] \right]^{-1} \text{ and}$$

$$h_{gas} = 0.023 * \frac{k_{gas}}{d_{tube}} * \left[ \frac{n\&_{gas} * d_{tube}}{A_{tube} * \mu_{gas}} \right]^{0.8} * \left[ \frac{c_{pgas} * \mu_{gas}}{0.001 * k_{gas}} \right]^{0.4} \text{ and}$$

$$h_{air} = 0.502 * \frac{k_{air}}{D_{tube}} * \left[ \frac{n\&_{air} * D_{tube}}{A_{bundle} * \mu_{air}} \right]^{0.568} * \left[ \frac{c_{pair} * \mu_{air}}{0.001 * k_{air}} \right]^{1/3} \text{ and}$$

$$R_{fouling} = \frac{1}{U_{HEdirty}} - \frac{1}{U_{HEclean}}$$

and $$LMTD = \frac{\lfloor (T_{gasHEin} - T_{airHEout}) - (T_{gasHEout} - T_{airamb(HEin)}) \rfloor}{\ln \lfloor (T_{gasHEin} - T_{airHEout}) / (T_{gasHEout} - T_{airamb(HEin)}) \rfloor}$$

The amount of heat transfer that occurs between the natural gas and air, the temperature of the heat exchanger outlet gas, and the temperature of the heat exchanger outlet air, can be determined by solving the three equations simultaneously, as follows;

$$q = U_{HE} * A_{HEext} * F * LMTD = m\&_{gasHE} * c_{pgas} * (T_{gasHEin} - T_{gasHEout}) = m\&_{airHE} * c_{pair} * (T_{airHEout} - T_{airamb(HEin)})$$

An increase in the natural gas mass flow rate through a heat exchanger will result in an increase in the overall heat transfer coefficient and thereby a greater heat transfer between the warm gas and cooling air, and vice versa. Given that the heat exchanger physical characteristics are constant and assuming that gas and air composition/characteristics (i.e. specific heat capacity, thermal conductivity and dynamic viscosity), heat exchanger inlet gas temperature, air mass flow rate, and ambient air temperature are essentially fixed, it can be shown that the overall heat transfer coefficient and amount of heat transfer are dependent upon the gas mass flow rate through the heat exchanger.

Conversely, an increase in the air mass flow rate through a heat exchanger will result in an increase in the overall heat transfer coefficient and thereby a greater heat transfer between the warm natural gas and cooling air, and vice versa. Given that the heat exchanger physical characteristics are constant and assuming that gas and air composition/characteristics (i.e. specific heat capacity, thermal conductivity and dynamic viscosity), heat exchanger inlet gas temperature, gas mass flow rate, and ambient air temperature are essentially fixed, it can be shown that the overall heat transfer coefficient and amount of heat transfer are dependent upon the air mass flow rate through the heat exchanger.

The resultant temperature of the natural gas downstream of a heat exchanger, that results from the mixture of the heat exchanger outlet gas and any non-cooled bypass gas, can be determined as follows (Note bypass gas temperature equals heat exchanger inlet gas temperature);

$$T_{gasmixed} = (\lfloor (m\&_{gascomp} - m\&_{gasHE}) * T_{gasHEin} \rfloor + \lfloor m\&_{gasHE} * T_{gasHEout} \rfloor) / m\&_{gascomp}$$

Gas passing through heat exchanger cooling tubes will undergo a pressure loss, as follows;

$$\Delta P_{gasHE} = 0.81057 * \frac{n\&^2_{gasHE}}{N_{HEtubes}} \times \frac{f_{tube} * L_{tube}}{\rho_{gas} * d^5_{tube}}$$

An increase in natural gas mass flow rate through a heat exchanger will result in a greater pressure loss across the heat exchanger, and vice versa. Assuming that gas composition (i.e. gas density) and heat exchanger tube friction factor, length, and diameter are essentially constant, it can be shown that the magnitude of the pressure loss is dependent upon the gas mass flow rate through the heat exchanger, as follows;

$$\Delta P_{gasHEnew} = \Delta P_{gasHEold} * \left(\frac{\dot{m}_{gasHEnew}}{\dot{m}_{gasHEold}}\right)^2$$

The effect lower natural gas temperature has on downstream compression conditions and thereby downstream compression power requirements depends on the length of the intervening piping/pipeline between the heat exchanger and downstream compressor. If the piping is short, any reduction in downstream compression power will result from a lower suction gas temperature (refer to Paragraphs 23 and 30). However the intervening pipeline may be of sufficient length such that the temperature of the gas leaving the pipeline is similar to the temperature of the gas had no upstream heat exchanger been present (i.e. equal to the ground temperature). In this instance any reduction in downstream compression power will result from a lower pipeline pressure loss and thereby higher suction gas pressure that is the result of cooler gas entering the pipeline (refer to Paragraphs 20 and 22). For pipelines of an intermediate length any reduction in downstream compression power will result from a combination of lower suction gas temperature and higher suction gas pressure.

The majority of the effect lower natural gas temperature has on reducing downstream compression power requirements (refer to Paragraph 33) can be redirected to the upstream compressor. It can be shown that it is possible to reduce the discharge pressure and thereby power requirements of the upstream compressor such that after the gas has passed through the exchanger there is no net negative impact on the original downstream compression power requirements. The reduction in upstream compression power is possible whether or not the downstream compressor is located adjacent to or at some distance along a pipeline from the upstream compressor.

The pressure loss associated with natural gas flowing through a heat exchanger will reduce the suction gas pressure at the downstream compressor and can result in an increase in compression power requirements (refer to Paragraphs 19, 22 and 32). As a result, depending on heat exchanger design (i.e. total cooling surface area, and number, configuration, length and diameter of the cooling tubes, and overall heat transfer coefficient), heat exchanger inlet gas pressure and temperature, and ambient air temperature, the specific heat capacity of the natural gas and air, and mass flow rate of the gas and air through the exchanger, the cooling of the natural gas may in some instances result in an increase in the downstream compression power. This can occur when the pressure loss which results from the gas flowing through the heat exchanger, and the consequent energy loss, is greater than the energy savings afforded from the lower gas temperature It can be shown that the rate of decrease in compression power savings resulting from a reduction in gas cooling, that results from decreasing the gas mass flow rate through a heat exchanger from 100 percent flow, is initially much less than the rate of decrease in compression power losses resulting from the consequent reduction in pressure loss (refer to Paragraphs 19, 20, 22, 23, 29, 30 and 32).

It can be shown that it is possible to calculate the optimum natural gas mass flow rate which will yield the maximum net compression power savings. In simple terms the optimum gas mass flow rate will occur at the point at which the rate of decrease in compression power savings (as the gas mass flow rate through the heat exchanger is reduced and thereby the amount of gas cooling is reduced) equals the rate of decrease in compression power losses (resulting from the consequent reduction in pressure loss across the heat exchanger). It is at this point that the greatest difference exists between compression power savings and losses. Further gas mass flow rate reduction will diminish the net savings because the rate of decrease in compression power savings becomes increasingly greater than the rate of decrease in compression power losses beyond this point.

The optimum natural gas mass flow rate will vary for every heat exchanger installation. In particular the optimum gas mass flow rate through a heat exchanger will vary depending on heat exchanger design (i.e. total cooling surface area, and number, configuration, length and diameter of the cooling tubes, and overall heat transfer coefficient), heat exchanger inlet gas pressure and temperature, ambient air temperature, the specific heat capacity of the natural gas and air, total gas mass flow rate from upstream compressor, air mass flow rate through the heat exchanger.

This invention provides an improvement upon prior art methods of optimizing energy costs by having the ability to determine the optimum natural gas mass flow rate through heat exchangers and control gas mass flow rate (when utilized in conjunction with an automated heat exchanger bypass valve), and thereby maintain the optimum amount of gas mass flow rate through heat exchangers, under varying operating conditions. This invention can continually maximize net compression power (and thereby net energy) savings afforded by heat exchangers on a real time basis, by continuously managing the gas mass flow rate through heat exchangers, based on variables such as the total gas mass flow rate from the upstream compressor, air mass flow rate through the heat exchanger, heat exchanger inlet gas pressure and temperature, ambient air temperature, and fouling resistance of the heat exchanger.

Referring to FIG. 1, there is shown a natural gas pipeline 10 upon which is located an upstream compressor 12. After the upstream compressor 12, the gas pipeline 10 continues through a heat exchanger bypass valve 14, through a station gas flow meter 16 and on to a downstream compressor 18. The bypass valve 14 will typically include a conventional equalization bridle piping assembly and bypass valve operator (not shown). Closing of the bypass valve 14 diverts gas flow in the gas pipeline 10 to the heat exchanger piping 20 which passes through a heat exchanger gas flow meter 24 and heat exchanger 22 and then returns to the gas pipeline 10 downstream of the bypass valve 14. All of the elements 10 to 24 are conventional.

Various sensors/transmitters are provided on these elements, depending on the embodiment of the invention that is used. The sensors make observations of operating parameters that are characteristic of gas flow through the compressor station "A" and transmit the observation to the heat exchanger management device (HEMD) hereinafter referred to as the "controller 46". Hereinafter, these devices will be referred to as transmitters. A temperature transmitter 36 (output is $T_{gasHEin}$) is provided on the inlet piping of the heat exchanger 22 to measure the heat exchanger inlet gas temperature. A temperature transmitter 38 (output is $T_{gasHEout}$) is provided on the outlet piping of the heat exchanger 22 to measure the heat exchanger outlet gas temperature. Temperature transmitters 29 (output is $T_{airHEout}$) and 28 (output is $T_{airamb(HEin)}$) and pressure transmitter 33 ($P_{airamb}$) are provided near the heat exchanger 22 to measure the heat exchanger outlet air temperature and ambient air temperature and pressure, respectively. A temperature transmitter 44 (output is $T_{gasmixed}$) is provided downstream of the heat exchanger piping 20 and gas pipeline 10 junction to measure the temperature of the recombined gas flow. A pressure transmitter 34 (output is $P_{gasHEin}$) is provided on the inlet piping of the heat exchanger 22 to measure the inlet gas pressure. A differential pressure transmitter 30 (output is $\Delta P_{gasHE}$) is provided on either the bridle piping assembly of the bypass valve 14 or between the heat exchanger inlet and outlet headers (i.e. on either side of the heat exchanger 22) to measure the pressure loss across the heat exchanger 22. A heat exchanger gas flow meter 24 complete with differential pressure transmitter 32 (output is $\Delta P_{gasmeter(HE)}$) in conjunction with pressure transmitter 34 (output is $P_{gasHEin}$) and temperature transmitter 36 (output is $T_{gasHEin}$) is provided on the exchanger piping 20 to measure the heat exchanger gas flow rate. A station gas flow meter 16 complete with pressure transmitter 40 (output is $P_{gasmeter(station)}$) and differential pressure transmitter 42 (output is $\Delta P_{gasmeter(station)}$) in conjunction with temperature transmitter 44 (output is $T_{gasmixed}$) is provided on the gas pipeline 10 to measure the total compressor station gas flow rate. A valve position transmitter 26 is provided on the heat exchanger bypass valve 14 operator to provide bypass valve position information (output is $BV_{position}$). Outputs from the transmitters 26 to 44 provided to controller 46, are described in more detail in relation to FIGS. 3 to 13. The controller 46 is preferably located adjacent to the heat exchanger bypass valve operator, where a suitable 12 to 24 VDC power supply is usually available. The controller 46 provides an output command signal (e.g. 12 to 24 VDC) to the heat exchanger bypass valve operator to either open (i.e. $BV_{open}$) or close (i.e. $BV_{closed}$) the bypass valve 14, as required. Elements 10, 12, 14, 16, 20, 22, 24 and 26 to 46 together constitute a compressor station "A". A further compressor station "B" downstream of compressor station "A" includes the gas pipeline 10 and downstream compressor 18.

In a method for controlling natural gas cooling in a gas pipeline, the flow of gas through a heat exchanger at a compressor station, preferably including the effects of components upstream and downstream from the compressor station, is first modeled. The results of the modeling are then analyzed based upon the principles described previously in Paragraphs 17 to 38. Based on the application of these principles and current operating conditions of the compressor station a balance is found between gas cooling and heat exchanger pressure loss that results in an improvement of energy savings, preferably close to an optimal level. Finally, a bypass valve on the gas pipeline is operated to divert an amount of gas into the exchanger that achieves the desired balance.

Applying the principles described previously in Paragraphs 17 to 38 and balancing the natural gas cooling and heat exchanger pressure loss based on the application of these principles and current operating conditions of the compressor station is carried out by a control algorithm that is preferably embodied within the controller 46, which may be a general purpose flow computer programmed according to this patent description. The following steps illustrate the development of the model and control algorithm with reference to FIGS. 2A and 2B.

Utilizing a flow analysis software (i.e. Simulation Science PRO/II, HYSYS or similar), create a model of compressor and heat exchanger and upstream and/or downstream pipeline(s), compressor(s), and heat exchanger(s) (step 50).

Run the model based on the current actual operating conditions (i.e. gas flow rate, gas temperature and pressure conditions) of heat exchanger to be optimized. Determine whether or not the calculated temperature and pressure conditions upstream and downstream of heat exchanger reflect the actual conditions within an acceptable level of accuracy? If not, then modify the model as required (step 52). If yes, then proceed to step 54.

Determine the actual temperature differential between the heat exchanger inlet gas and ambient air for the average Spring, Summer, Fall, Winter, and peak high and peak low ambient air temperature day, based on operating records for the heat exchanger being modeled. Record this information (step 54).

Determine the actual average gas flow rate and peak high and low gas flow rates through the compressor and the corresponding compressor discharge gas pressure at these flow rates, based on operating records for the compressor associated with heat exchanger being modeled. Record this information (step 56).

Determine the percentage of compressor gas flow typically diverted through the heat exchanger and the corresponding pressure loss across the exchanger, given the actual average gas flow rate and peak high and peak low gas flow rates through the compressor, based on operating records for the heat exchanger being modeled. Record this information (step 58).

Determine the percentage of the total number of heat exchanger cooling fans that typically would be utilized to cool the gas during the average Spring, Summer, Fall, Winter and peak high and peak low ambient air temperature day, based on operating records for the heat exchanger being modeled. Record this information (step 60).

Run the model using the compressor gas flow rate, compressor discharge gas pressure and the temperature differential between the heat exchanger inlet gas and ambient air, corresponding to the average Spring day, with 100% of the compressor gas flow rate diverted through the exchanger (i.e. 0% exchanger bypass flow) and all of the cooling fans operating. Record the following information from the output data (step 62);

percentage of gas flow through the heat exchanger
  pressure loss across the heat exchanger
  compressor suction and discharge gas pressure and temperature for all of the compressors in the model
  power requirements for all of the compressors in the model
  incremental change in compression power from the baseline power requirement (identified in the operating records) for all of the compressors in the model Vary the gas flow rate through the heat exchanger from 100% to 0% of the total compressor gas flow rate, in 10% increments, recording the same data as stated above in step 62, for each gas flow rate increment (step 64).

Plot the heat exchanger gas flow rate percentage along the "X" axis and the total incremental change in compression power (from all of the compressors in the model) along the "Y" axis (step 66).

From the graph plotted in step 66 determine the minimum power required to transport the given gas flow rate through the pipeline(s). This point coincides with the optimum heat exchanger gas flow rate (step 68).

Determine the optimum heat exchanger gas pressure differential associated with the optimum exchanger gas flow rate and record this information together with the corresponding temperature differential between the heat exchanger inlet gas and ambient air (step 70).

Repeat steps 62 through 70 for various temperature differentials between the heat exchanger inlet gas and ambient air to obtain at least five other optimum operating points (i.e.

repeat for the average Summer, Fall, Winter and peak high and peak low ambient air temperature days) (step 72).

Plot the temperature differential between the heat exchanger inlet gas and ambient air along the "X" axis and the optimum heat exchanger gas pressure differential along the "Y" axis for the six optimum operating points produced after completing step 72 (step 74).

Determine the mathematical relationship between the temperature differential (between the heat exchanger inlet gas and ambient air) and the optimum heat exchanger gas pressure differential based on the graph constructed in step 74. The mathematical equation for the line joining the different data points results in a basic heat exchanger control algorithm for the modeled exchanger (step 76).

Repeat steps 62 to 76 for at least two different gas flow rates (i.e. peak high and peak low gas flow rates through the compressor) to determine the sensitivity of the heat exchanger control algorithm to changes in flow rates. This information can then be utilized to modify the control algorithm to account for changes in gas flow rate (step 78).

Determine whether or not the temperature and pressure conditions upstream and downstream of heat exchanger predicted upon implementation of the control algorithm reflect the actual conditions within an acceptable level of accuracy? If not, then modify the control algorithm as required (step 80). If yes, then no further steps are required.

When compared with traditional heat exchanger operation at a given gas flow rate, optimizing heat exchanger operation results in either the transportation of more gas for the same compression power (i.e. energy) input or the transportation of the same amount of gas for less power (i.e. energy) input.

Heat exchanger optimization can be utilized to either decrease the amount of compression power required from the compressor 12 immediately upstream of the exchanger 22, or it can be utilized to lower the compression power requirements of the downstream compressors 18 (i.e. compressor 18). In the latter instance heat exchanger optimization can lower the amount of compression power required for the next two to three downstream compressors and thereby can result in greater energy savings. Whether the heat exchanger optimization will reduce the upstream and/or downstream compression power requirements depends upon how the pipeline system is modeled. In order to create a control algorithm that lowers the compression power requirements of the downstream pipeline system, the compressor immediately upstream of the exchanger should be modeled to control on constant compressor discharge gas pressure. In order to create a control algorithm that decreases the amount of compression power required for the compressor immediately upstream of the exchanger, the upstream compressor station should be modeled to control on constant station discharge gas pressure.

In order to determine the impact of heat exchanger optimization it is necessary to first establish a baseline. This can be done by reviewing the operating history for the upstream and/or downstream compressor(s) and comparing the power requirements versus gas throughput ratio before heat exchanger operation has been optimized, to the same ratio after optimization has occurred (note the impact of any re-calibration of instrumentation involved with these measurements has to be assessed prior to deriving these ratios). This requires monitoring the gas flow rate through the upstream and/or downstream compressor(s) and the fuel (i.e. energy) consumption of the compressor drivers (e.g. gas turbines).

The inputs to and outputs from a controller 46 according to the invention (see FIG. 1) are shown in FIGS. 3 to 13. In all ten embodiments shown in FIGS. 3 to 13, the controller 46 controls gas flow through a heat exchanger. Transmitters 30, 34, 36, 38, 28, 29 (optional), and 33 (optional) are provided with all embodiments. The $\Delta P_{gasHE}$, $P_{gasHEin}$, $T_{gasHEin}$, $T_{gasHEout}$, $T_{airamb(HEin)}$, $T_{airHEout}$ (optional), and $P_{airamb}$ (optional) signals from these transmitters are acquired and routed into the controller 46. The controller 46 monitors the actual heat exchanger gas pressure differential ($\Delta P_{gasHE}$) and compares this to the optimum heat exchanger gas pressure differential based upon a pre-programmed control algorithm. If the actual heat exchanger gas pressure differential ($\Delta P_{gasHE}$) varies from the optimum heat exchanger gas pressure differential (as calculated by the control algorithm) the controller 46 sends a command signal (e.g. 12 to 24 VDC) to the operator of the heat exchanger bypass valve 14 to either open ($BV_{open}$) or close ($BV_{close}$) the bypass valve 14, as required. The command signal to move the bypass valve 14 will continue until the gas pressure differential ($\Delta P_{gasHE}$) equals the optimum differential pressure calculated by the control algorithm. The controller 46 is based on commercially available flow computer technology together with added circuitry to accommodate the control algorithm which is calibrated/programmed with actual heat exchanger operating conditions and gas flow rate at the time of commissioning ($Data_{in}$). The accuracy with which the control algorithm optimizes heat exchanger operation depends upon how closely the algorithm reflects the actual operating conditions of the heat exchanger. However, heat exchanger operating conditions can change with time. In order to ensure the accuracy of the control algorithm, programming updates for the algorithm are periodically required. In order to provide these programming updates it is first necessary to retrieve information regarding controller 46 status and actual heat exchanger operating parameters. These programming uploads and information downloads are possible through interfacing with either a local or remote upload/download devices (e.g. computer) via the controller 46 data input ($Data_{in}$) and data output ($Data_{out}$), respectively.

In a first embodiment shown in FIG. 3, transmitters are provided as discussed in Paragraph 60. Heat exchanger gas flow measurement ($Q_{gasstdHEest}$) and periodic compressor station gas flow measurement ($Q_{gasstdstationest}$), are estimated in the manner described in Paragraphs 76B and 76M, respectively. The accuracy of these estimated gas flow measurements is contingent upon there being no change in internal fouling of the heat exchanger ($R_{fouling}$). This is because a change in internal fouling ($R_{fouling}$) would affect the heat exchanger gas pressure differential ($\Delta P_{gasHE}$) in a similar fashion as a change in gas flow rate (i.e. an increase in internal fouling would result in an increase the pressure differential as would an increase in gas flow rate). In this embodiment both the estimated heat exchanger gas flow measurement ($Q_{gasstdHEest}$) and compressor station gas flow measurement ($Q_{gasstdstationest}$) calculations utilize heat exchanger gas pressure differential ($\Delta P_{gasHE}$) data. Should a change in internal fouling ($R_{fouling}$) occur then these estimated gas flow measurements would be compromised.

In a second embodiment shown in FIG. 4, transmitter 26 is provided together with the transmitters included in embodiment one. The $BV_{position}$ signal from this transmitter is acquired and routed into the controller 46. The second embodiment includes all of the functionality of embodiment one. Actual heat exchanger bypass valve gas flow measurement ($Q_{gasstdbypassactual}$) is calculated in the manner described in either Paragraph 76H or 76I. Estimated compressor station gas flow measurement ($Q_{gasstdstationest}$) is calculated based on estimated heat exchanger gas flow measurement ($Q_{gasstdHEest}$) and actual heat exchanger bypass valve gas flow measurement ($Q_{gasstdbypassactual}$), in the manner described in Paragraph 76N. The accuracy of the estimated gas flow measurements is contingent upon there being no change in internal fouling of the heat exchanger ($R_{fouling}$), as with embodiment one and would be compromised should a change in internal fouling ($R_{fouling}$) occur. It is possible to detect whether or not internal and/or external fouling of the heat exchanger ($R_{fouling}$) has occurred if actual compressor station gas flow measurement ($Q_{gasstdstationactual}$) data is available (i.e. from outside sources in the case of embodiment two) over the same time period as gas flow measurement data recorded by the controller 46. The actual heat exchanger gas flow measurement ($Q_{gasstdHEactual}$) can be calculated based on actual heat exchanger bypass valve gas flow measurement ($Q_{gasstdbypassactual}$) and compressor station gas flow measurement ($Q_{gasstdstationactual}$) in a manner described in Paragraph 76D. Any change in internal and/or external fouling of the heat exchanger ($R_{fouling}$) can be detected and quantified based on original and actual heat exchanger gas flow measurement ($Q_{gasstdHEorig}$ and $Q_{gasstdHEactual}$, respectively), in the manner described in Paragraphs 76T, 76U, 76V, 76W, 76X, 76Y, 76Z, 76AA, 76BB, and 76CC. This information can then be utilized to modify the control algorithm, if necessary.

In a third embodiment shown in FIG. 5, transmitter 32 is provided together with the transmitters included in embodiments one and two. The heat exchanger gas flow meter pressure differential ($\Delta P_{gasmeter(HE)}$) signal from this transmitter is acquired and routed into the controller 46. The third embodiment includes all of the functionality of embodiments one and two. Actual heat exchanger gas flow measurement ($Q_{gasstdHEactual}$) is calculated in the manner described in Paragraph 76C. Actual compressor station gas flow measurement ($Q_{gasstdstationactual}$) is calculated based on actual heat exchanger gas flow measurement ($Q_{gasstdHEactual}$) and heat exchanger bypass valve gas flow measurement ($Q_{gasstdbypassactual}$), in the manner described in Paragraph 76Q. The accuracy of the actual gas flow measurement is not affected by a change in internal fouling of the heat exchanger ($R_{fouling}$). Any change in internal and/or external fouling of the heat exchanger ($R_{fouling}$) can be detected and quantified based on original and actual heat exchanger gas flow measurement ($Q_{gasstdHEorig}$ and $Q_{gasstdHEactual}$, respectively), as described in embodiment two. As with embodiment two, this information can then be utilized to modify the control algorithm, if necessary.

In a fourth embodiment shown in FIG. 6, transmitters 42 and 40 are provided together with the transmitters included in embodiments one and two. The compressor station gas flow meter pressure differential ($\Delta P_{gasmeter(station)}$) and compressor station gas flow meter pressure ($P_{gasmeter(station)}$) signals from this transmitter are acquired and routed into the controller 46. The fourth embodiment includes all of the functionality of embodiments one and two. Actual compressor station gas flow measurement ($Q_{gasstdstationactual}$) is calculated in the manner described in Paragraph 76P. Actual heat exchanger gas flow measurement ($Q_{gasstdHEactual}$) is calculated based on actual compressor station gas flow measurement ($Q_{gasstdstationactual}$) and heat exchanger bypass valve gas flow measurement ($Q_{gasstdbypassactual}$), in the manner described in Paragraph 76D. As with embodiment three, the accuracy of the actual gas flow measurement is not affected by a change in internal fouling of the heat exchanger ($R_{fouling}$). Any change in internal and/or external fouling of the heat exchanger ($R_{fouling}$) can be detected and quantified based on original and actual heat exchanger gas flow measurement ($Q_{gasstdHEorig}$ and $Q_{gasstdHEactual}$, respectively), as described in embodiment two. As with embodiment two, this information can then be utilized to modify the control algorithm, if necessary.

In a fifth embodiment shown in FIG. 7, transmitter 44 is provided together with the transmitters included in embodiment one. The gas temperature downstream of the heat exchanger piping and heat exchanger bypass piping junction ($T_{gasmixed}$) signal from this transmitter is acquired and routed into the controller 46. The fifth embodiment includes all of the functionality of embodiment one. Estimated heat exchanger gas flow measurement ($Q_{gasstdHEactual}$) is calculated in the manner described in Paragraph 76B, as with embodiment one. Estimated heat exchanger bypass valve gas flow measurement ($Q_{gasstdbypassest}$) is calculated based on estimated heat exchanger gas flow measurement ($Q_{gasstdHEest}$), in the manner described in Paragraph 76G. Estimated compressor station gas flow measurement ($Q_{gasstdstationest}$) is calculated based on estimated heat exchanger gas flow measurement ($Q_{gasstdHEest}$) and gas temperature downstream of heat exchanger piping and heat exchanger bypass piping junction ($T_{gasmixed}$), in the manner described in Paragraph 76O. The accuracy of the estimated gas flow measurements is contingent upon there being no change in internal fouling of the heat exchanger ($R_{fouling}$), as with embodiment one and would be compromised should a change in internal fouling ($R_{fouling}$) occur. It is possible to detect whether or not internal and/or external fouling of the heat exchanger ($R_{fouling}$) has occurred if actual compressor station gas flow measurement ($Q_{gasstdstationactual}$) data is available (i.e. from outside sources in the case of embodiment five) over the same time period as the gas flow measurement data recorded by the controller 46. The actual heat exchanger gas flow measurement ($Q_{gasstdHEactual}$) can be calculated based on actual compressor station gas flow measurement ($Q_{gasstdstationactual}$) and estimated compressor station gas flow measurement ($Q_{gasstdstationest}$) in a manner described in Paragraph 76GG. Any change in internal and/or external fouling of the heat exchanger ($R_{fouling}$) can be detected and quantified based on original and actual heat exchanger gas flow measurement ($Q_{gasstdHEorig}$ and $Q_{gasstdHEactual}$, respectively), in the manner described in Paragraphs 76T, 76U, 76V, 76W, 76X, 76Y, 76Z, 76AA, 76BB, and 76CC. This information can then be utilized to modify the control algorithm, if necessary.

In a sixth embodiment shown in FIG. 8, transmitter 32 is provided together with the transmitters included in embodiments one and five. The heat exchanger gas flow meter pressure differential ($\Delta P_{gasmeter(HE)}$) signal from this transmitter is acquired and routed into the controller 46. The sixth embodiment includes all of the functionality of embodiments one and five. Actual heat exchanger gas flow measurement ($Q_{gasstdHEactual}$) is calculated in the manner described in Paragraph 76C. Actual heat exchanger bypass valve gas flow measurement ($Q_{gasstdbypassactual}$) is calculated based on actual heat exchanger gas flow measurement ($Q_{gasstdHEactual}$) and gas temperature downstream of heat exchanger piping and heat exchanger bypass piping junction ($T_{gasmixed}$), in the manner described in Paragraph 76K. Actual compressor station gas flow measurement ($Q_{gasstdstationactual}$) is calculated based on actual heat exchanger gas flow measurement ($Q_{gasstdHEactual}$) and gas temperature downstream of heat exchanger piping and heat exchanger bypass piping junction ($T_{gasmixed}$), in the manner described in Paragraph 76R. The accuracy of the actual gas flow measurement is not affected by a change in internal fouling of the heat exchanger ($R_{fouling}$). Any change in internal and/or external fouling of the heat exchanger ($R_{fouling}$) can be detected and quantified based on original and actual heat exchanger gas flow measurement ($Q_{gasstdHEorig}$ and $Q_{gasstdHEactual}$, respectively), as described in embodiment five. As with embodiment five, this information can then be utilized to modify the control algorithm, if necessary.

In a seventh embodiment shown in FIG. 9, transmitters 42 and 40 are provided together with the transmitters included in embodiments one and five. The compressor station gas flow meter pressure differential ($\Delta P_{gasmeter(station)}$) and compressor station gas flow meter pressure ($P_{gasmeter(station)}$) signals from this transmitter are acquired and routed into the controller 46. The seventh embodiment includes all of the functionality of embodiments one and five. Actual compressor station gas flow measurement ($Q_{gasstdstationactual}$) is calculated in the manner described in Paragraph 76P. Actual heat exchanger bypass valve gas flow measurement ($Q_{gasstdbypassactual}$) is calculated based on actual compressor station gas flow measurement ($Q_{gasstdstationactual}$) and gas temperature downstream of heat exchanger piping and heat exchanger bypass piping junction ($T_{gasmixed}$), in the manner described in Paragraph 76L. Actual heat exchanger gas flow measurement ($Q_{gasstdHEactual}$) is calculated based on actual compressor station gas flow measurement ($Q_{gasstdstationactual}$) and gas temperature downstream of heat exchanger piping and heat exchanger bypass piping junction ($T_{gasmixed}$), in the manner described in Paragraph 76F. As with embodiment six, the accuracy of the actual gas flow measurement is not affected by a change in internal fouling of the heat exchanger ($R_{fouling}$). Any change in internal and/or external fouling of the heat exchanger ($R_{fouling}$) can be detected and quantified based on original and actual heat exchanger gas flow measurement ($Q_{gasstdHEorig}$ and $Q_{gasstdHEactual}$, respectively), as described in embodiment five. As with embodiment five, this information can then be utilized to modify the control algorithm, if necessary.

In an eighth embodiment shown in FIG. 10, transmitter 26 is provided together with the transmitters included in embodiment five. The heat exchanger bypass valve position ($BV_{position}$) signal from this transmitter is acquired and routed into the controller 46. The eighth embodiment includes all of the functionality of embodiments one, two, and five. As with embodiment two, actual heat exchanger bypass valve gas flow measurement ($Q_{gasstdbypassactual}$) is calculated in the manner described in either Paragraph 76H or 76I. Actual compressor station gas flow measurement ($Q_{gasstdstationactual}$) is calculated based on actual heat exchanger bypass valve gas flow measurement ($Q_{gasstdbypassactual}$) and gas temperature downstream of heat exchanger piping and heat exchanger bypass piping junction ($T_{gasmixed}$), in the manner described in Paragraph 76S. The accuracy of the actual gas flow measurement is not affected by a change in internal fouling of the heat exchanger ($R_{fouling}$). Any change in internal and/or external fouling of the heat exchanger ($R_{fouling}$) can be detected and quantified based on original and actual heat exchanger gas flow measurement ($Q_{gasstdHEorig}$ and $Q_{gasstdHEactual}$, respectively), as described in embodiments two and five. As with embodiments two and five, this information can then be utilized to modify the control algorithm, if necessary.

In an ninth embodiment shown in FIG. 11, transmitter 32 is provided together with all of the transmitters included in embodiment eight. The heat exchanger gas flow meter pressure differential ($\Delta P_{gasmeter(HE)}$) signal from this transmitter is acquired and routed into the controller 46. The ninth embodiment includes all of the functionality of embodiments one, two, three, five, six and eight. As with embodiment three, actual heat exchanger gas flow measurement ($Q_{gasstdHEactual}$) is calculated in the manner described in Paragraph 76C. This embodiment provides two independent methods for calculating $Q_{gasstdHEactual}$, $Q_{gasstdbypassactual}$, $Q_{gasstdstationactual}$ and thereby $\Delta P_{gasmeter(HE)}$, $U_{HE}$, and $R_{fouling}$, which allows for cross checking of these calculations. This provides a greater degree of accuracy when modifying and reprogramming the control algorithm to obtain the optimum balance between gas cooling and heat exchanger pressure loss.

In an tenth embodiment shown in FIG. 12, transmitters 42 and 40 are provided together with all of the transmitters included in embodiment eight. The compressor station gas flow meter pressure differential ($\Delta P_{gasmeter(station)}$) and compressor station gas flow meter pressure ($P_{gasmeter(station)}$) signals from this transmitter are acquired and routed into the controller 46. The tenth embodiment includes all of the functionality of embodiments one, two, four, five, seven and eight. As with embodiment four, actual compressor station gas flow measurement ($Q_{gasstdstationactual}$) is calculated in the manner described in Paragraph 76P. This embodiment provides two independent methods for calculating $Q_{gasstdHEactual}$, $Q_{gasstdbypassactual}$, $Q_{gasstdstationactual}$ and thereby $\Delta P_{gasmeter(HE)}$, $U_{HE}$, and $R_{fouling}$, which allows for cross checking of these calculations. This provides a greater degree of accuracy when modifying and reprogramming the control algorithm to obtain the optimum balance between gas cooling and heat exchanger pressure loss.

In an eleventh embodiment shown in FIG. 13, transmitters include all of those found in embodiment eight and nine. The eleventh embodiment includes all of the functionality of embodiments one, two, three, four, five, six, seven, eight, nine and ten. This embodiment provides three independent methods for calculating $Q_{gasstdHEactual}$, $Q_{gasstdbypassactual}$, $Q_{gasstdstationactual}$ and thereby $\Delta P_{gasmeter(HE)}$, $U_{HE}$, and $R_{fouling}$, which allows for multiple cross checking of these calculations. This provides a greater degree of accuracy when modifying and reprogramming the control algorithm to obtain the optimum balance between gas cooling and heat exchanger pressure loss.

The following inputs and outputs are utilized and/or generated by the control algorithm;

A) $T_{gasHEin}$—heat exchanger inlet natural gas temperature, ° K

B) $T_{gasHEout}$—heat exchanger outlet natural gas temperature, ° K

C) $T_{airamb(HEin)}$—ambient air temperature (i.e. heat exchanger inlet air temp), ° K D) $P_{airamb}$—ambient air pressure, kPa(a) (optional)

E) $T_{gasmixed}$—natural gas temperature resulting from the mixture of the heat exchanger outlet gas ($T_{gasHEout}$) and the non-cooled bypass gas ($T_{gasHEin}$), ° K F) $P_{gasHEin}$—heat exchanger inlet natural gas pressure, kpa(a)

G) $\Delta P_{gasHE}$—natural gas pressure differential across heat exchanger, kPa(g)

H) $\Delta P_{gasmeter(HE)}$—natural gas pressure differential across heat exchanger gas flow meter, kpa(g)

I) $\Delta P_{gasmeter(station)}$—natural gas pressure differential across compressor station gas flow meter, kpa(g)

J) $P_{gasmeter(station)}$—natural gas pressure at compressor station gas flow meter, kPa(a)

K) $T_{airHEout}$—heat exchanger outlet air temperature, ° K (optional)

L) $BV_{position}$—heat exchanger bypass valve actual position

M) $BV_{open}$—heat exchanger bypass valve open command signal

N) $BV_{closed}$—heat exchanger bypass valve closed command signal

O) Power Supply—power supply to HEMD (12 to 24 VDC)

P) $Data_{out}$—HEMD operating data (historical and/or real time) for download to local and/or remote monitoring device(s). Depending on the type of sensors/transmitters available to the HEMD, data output can include some or all of the following information; $T_{gasHEin}$, $T_{gasHEout}$, $T_{airamb(HEin)}$, $P_{airamb}$, $T_{gasmixed}$, $P_{gasHEin}$, $\Delta P_{gasHE}$, $\Delta P_{gasmeter(HE)}$ or $\Delta P_{gasmeter(station)}$ (or calculated gas flow rate "$Q_{gasstdHE}$" or "$Q_{gasstdstation}$"), $P_{gasmeter(station)}$, $T_{airHEout}$, $BV_{position}$ (or calculated $A_{BVopen}$), calculated internal and external fouling heat transfer coefficients, power supply voltage, current control algorithm, and the time and date the data is recorded.

Q) $Data_{in}$—Calibration/programming data from local and/or remote upload device(s) to re-calibrate and update the HEMD software. Depending on the type of sensors/transmitters available to the HEMD, data input can include some or all of the following parameters; $T_{gasHEin}$, $T_{gasHEout}$, $T_{airamb(HEin)}$, $P_{airamb}$, $T_{gasmixed}$, $P_{gasHEin}$, $\Delta P_{gasHE}$, $\Delta P_{gasmeter(HE)}$ or $\Delta P_{gasmeter(station)}$, $P_{gasmeter(station)}$, $T_{airHEout}$, $BV_{position}$, current internal and external fouling heat transfer coefficients, power supply voltage, updated control algorithm, and time and date the data is entered.

The control algorithm may use some or all of the following calculations:

A) Given ongoing $P_{gasHEin}$, and $T_{gasHEin}$ data is available to the HEMD, then the natural gas specific gravity ($SG_{gas}$) and compressibility factor ($Z_{gas}$) are calculated based upon the on going data and the natural gas properties using the Benedict Webb Rubin (i.e. BWR) equation of state.

B) Given ongoing $\Delta P_{gasHE}$, $P_{gasHEin}$, $T_{gasHEin}$, $Z_{gas}$, and $SG_{gas}$ data is available to the HEMD and that $\Delta P_{gasHEorig}$, $P_{gasHEinorig}$, $T_{gasHEinorig}$, $Z_{gasorig}$, $SG_{gasorig}$, and $Q_{gasstdHEorig}$ has been previously recorded when 100% of the natural gas flow was diverted through the heat exchanger during the initial calibration/programming of the HEMD, then the estimated gas flow rate through the heat exchanger ($Q_{gasstdHEest}$) can be calculated as follows; (Note the accuracy of this calculation is dependent upon the heat exchanger fouling resistance remaining constant)

$$Q_{gasstdHEest} = Q_{gasstdHEorig} *$$
$$\left[\left(\frac{\Delta P_{gasHE}}{\Delta P_{gasHEorig}}\right)*\left(\frac{SG_{gasorig}}{SG_{gas}}\right)*\left(\frac{P_{gasHEin}}{P_{gasHEinorig}}\right)*\left(\frac{T_{gasHEinorig}}{T_{gasHEin}}\right)*\left(\frac{z_{gasorig}}{z_{gas}}\right)\right]^{.05}$$

C) Given on going $\Delta P_{gasmeter(HE)}$, $P_{gasHEin}$, $T_{gasHEin}$, $Z_{gas}$, $SG_{gas}$, and heat exchanger gas flow orifice meter opening area (i.e. $A_{orificeHE}$), data is available to the HEMD (Note $Y_{orifice}$ and $C_{orifice}$ are based on the relationship of $A_{orificeHE}$ to the cross-sectional area of the piping associated with the orifice meter and can be obtained from lookup tables), then the actual natural gas flow rate through the heat exchanger ($Q_{gasstdHEactual}$) can be calculated as follows;

$$Q_{gasstdHEactual} = 1.2775 * Y_{orificeHE} * C_{orificeHE} *$$
$$A_{orificeHE} * \left[\left(\frac{\Delta P_{gasmeter(HE)}}{SG_{gas} * z_{gas}}\right)*\left(\frac{P_{gasHEin}}{P_{gasstd}}\right)*\left(\frac{T_{gasstd}}{T_{gasHEin}}\right)\right]^{0.5}$$

D) Alternatively to Calculations "C", "E" and "F", given on going $Q_{gasstdbypassactual}$ (from Calculation "H" or "I", as appropriate or "L") and $Q_{gasstdstationactual}$ (from Calculation "P", or "S"), then the actual natural gas flow rate through the heat exchanger ($Q_{gasstdHEactual}$) can be calculated as follows;

$$Q_{gasstdHEactual} = Q_{gasstdstationactual} - Q_{gasstdbypassactual}$$

E) Alternatively to Calculation "C", "D" and "F", given ongoing $Q_{gasstdbypassactual}$ (from Calculation "H" or "I", as appropriate or "L"), $T_{gasHEin}$, $T_{gasHEout}$, and $T_{gasmixed}$ data is available to the HEMD, then the actual natural gas flow rate through the heat exchanger ($Q_{gasstdHEactual}$) can be calculated by iteration, as follows;

$$Q_{gasstdHEactual} = (Q_{gasstdHEactual} + Q_{gasstdbypassactual}) - \left(\frac{[(Q_{gasstdHEactual} + Q_{gasstdbypassactual}) * T_{gasmixed}] - [Q_{gasstdHEactual} * T_{gasHEout}]}{T_{gasHEin}}\right)$$

F) Alternatively to Calculation "C", "D" and "E", given ongoing $Q_{gasstdstationactual}$ (from Calculation "P" or "S"), $T_{gasHEin}$, $T_{gasHEout}$, and $T_{gasmixed}$ data is available to the HEMD, then the actual natural gas flow rate through the heat exchanger ($Q_{gasstdHEactual}$) can be calculated by iteration, as follows;

$$Q_{gasstdHEactual} = Q_{gasstdstationactual} - \left(\frac{[Q_{gasstdstationactual} * T_{gasmixed}] - [Q_{gasstdHEactual} * T_{gasHEout}]}{T_{gasHEin}}\right)$$

G) Given ongoing $Q_{gasstdHEest}$ (from Calculation "B"), $T_{gasHEin}$, $T_{gasHEout}$, and $T_{gasmixed}$ data is available to the HEMD, then the estimated natural gas flow rate through the heat exchanger ($Q_{gasstdbypassest}$) can be calculated by iteration, as follows;

$$Q_{gasstdbypassest} = \left(\frac{[(Q_{gasstdbypassest} + Q_{gasstdHEest}) * T_{gasmixed}] - [Q_{gasstdHEest} * T_{gasHEout}]}{T_{gasHEin}}\right)$$

H) Given the heat exchanger bypass valve is a vertical displacement slab type (i.e. gate) valve. Then given ongoing $\Delta P_{gasHE}$, $P_{gasHEin}$, $T_{gasHEin}$, $Z_{gas}$, $SG_{gas}$, and $BV_{position}$ data is available to the HEMD and converting $BV_{position}$ into a heat exchanger bypass valve opening area (i.e. $A_{BVopen}$) (Note $Y_{BV}$ and $C_{BV}$ are based on the relationship of $A_{BVopen}$ to the cross-sectional area of the bypass piping associated with the heat exchanger bypass valve and can be obtained from lookup tables), the actual natural gas flow rate through the heat exchanger ($Q_{gasstdbypassactual}$) can be calculated, as follows;

$$Q_{gasstdbypassactual} = 1.2775 * Y_{BV} * C_{BV} * A_{BVopen} * \left[\left(\frac{\Delta P_{gasHE}}{SG_{gas} * z_{gas}}\right) * \left(\frac{P_{gasHEin}}{P_{gasstd}}\right) * \left(\frac{T_{gasstd}}{T_{gasHEin}}\right)\right]^{0.5}$$

I) Given the heat exchanger bypass valve is a quarter turn type (i.e. ball or plug) valve then $\Delta P_{gasHE}$ must be divided by two Then given ongoing $\Delta P_{gasHE}$, $P_{gasHEin}$, $T_{gasHEin}$, $Z_{gas}$, $SG_{gas}$, and $BV_{position}$ data is available to the HEMD and converting $BV_{position}$ into a heat exchanger bypass valve opening area (i.e. $A_{BVopen}$) (Note $Y_{BV}$ and $C_{BV}$ are based on the relationship of $A_{BVopen}$ to the cross-sectional area of the bypass piping associated with the heat exchanger bypass valve and can be obtained from lookup tables), the actual natural gas flow rate through the heat exchanger ($Q_{gasstdbypassactual}$) can be calculated, as follows;

$$Q_{gasstdbypassactual} = 0.9033 * Y_{BV} * C_{BV} * A_{BVopen} * \left[\left(\frac{\Delta P_{gasHE}}{SG_{gas} * z_{gas}}\right) * \left(\frac{P_{gasHEin}}{P_{gasstd}}\right) * \left(\frac{T_{gasstd}}{T_{gasHEin}}\right)\right]^{0.5}$$

J) Alternatively to Calculations "H" or "I", as appropriate or "K" or "L") given on going $Q_{gasstdstationactual}$ (from Calculation "P" or "R") and $Q_{gasstdHEactual}$ (from Calculation "C" or "F"), then the actual natural gas flow rate through the heat exchanger ($Q_{gasstdbypassactual}$) can be calculated as follows;

$$Q_{gasstdbypassactual} = Q_{gasstdstationactual} - Q_{gasstdHEactual}$$

K) Alternatively to Calculation "H" or "I" as appropriate or "J" or "L", given ongoing $Q_{gasstdHEactual}$ (from Calculation "C" or "F"), $T_{gasHEin}$, $T_{gasHEout}$, and $T_{gasmixed}$ data is available to the HEMD, then the actual natural gas flow rate through the heat exchanger ($Q_{gasstdbypassactual}$) can be calculated by iteration, as follows;

$$Q_{gasstdbypassactual} = \left(\frac{[(Q_{gasstdbypassactual} + Q_{gasstdHEactual}) * T_{gasmixed}] - [Q_{gasstdHEactual} * T_{gasHEout}]}{T_{gasHEin}}\right)$$

L) Alternatively to Calculation "H" or "I", as appropriate or "J" or "K", given ongoing $Q_{gasstdstationactual}$ (from Calculation "P" or "R"), $T_{gasHEin}$, $T_{gasHEout}$, and $T_{gasmixed}$ data is available to the HEMD, then the actual natural gas flow rate through the heat exchanger ($Q_{gasstdbypassactual}$) can be calculated by iteration, as follows;

$$Q_{gasstdbypassactual} = \left(\frac{[Q_{gasstdstationactual} * T_{gasmixed}] - [(Q_{gasstdstationactual} - Q_{gasstdbypassactual}) * T_{gasHEout}]}{T_{gasHEin}}\right)$$

M) Given ongoing $\Delta P_{gasHE}$, $P_{gasHEin}$, $T_{gasHEin}$, $Z_{gas}$, and $SG_{gas}$ data is available to the HEMD and that $\Delta P_{gasHEorig}$, $P_{gasHEinorig}$, $T_{gasHEinorig}$, $Z_{gasorig}$, $SG_{gasorig}$, and $Q_{gasstdHEorig}$ has been previously recorded when 100% of the natural gas flow was diverted through the heat exchanger during the initial calibration/programming of the HEMD. Then with the heat exchanger bypass valve temporarily closed to again divert 100% of the gas flow through the heat exchanger, the periodic estimated gas flow rate through the compressor station ($Q_{gasstdstationest}$) can be calculated as follows; (Note the accuracy of this calculation is dependent upon the heat exchanger fouling resistance remaining constant)

$$Q_{gasstdstationest} = Q_{gasstdstationorig} * \left[\left(\frac{\Delta P_{gasHE}}{\Delta P_{gasHEorig}}\right) * \left(\frac{SG_{gasorig}}{SG_{gas}}\right) * \left(\frac{P_{gasHEin}}{P_{gasHEinorig}}\right) * \left(\frac{T_{gasHEorig}}{T_{gasHEin}}\right) * \left(\frac{z_{gasorig}}{z_{gas}}\right)\right]^{0.5}$$

N) Alternatively to Calculation "M" or "O", given ongoing $Q_{gasstdbypassactual}$ (from Calculation "H" or "I") and $Q_{gasstdHEest}$ (from Calculation "B") data is available to the HEMD, then the estimated natural gas flow rate through the compressor station ($Q_{gasstdstationest}$) can be calculated with the heat exchanger bypass valve in the "as found" position (i.e. without temporarily closing the bypass valve as in Calculation "M"), as follows;

$$Q_{gasstdstationest} = Q_{gasstdbypassactual} + Q_{gasstdHEest}$$

O) Alternatively to Calculation "M" or "N", given ongoing $Q_{gasstdHEest}$ (from Calculation "B"), $T_{gasHEin}$, $T_{gasHEout}$, and $T_{gasmixed}$ data is available to the HEMD, then the actual natural gas flow rate through the heat exchanger ($Q_{gasstdstationest}$) can be calculated by iteration, as follows;

$$Q_{gasstdstationest} = Q_{gasstdHEest} + \left(\frac{[Q_{gasstdstationest} * T_{gasmixed}] - [Q_{gasstdHEest} * T_{gasHEout}]}{T_{gasHEin}}\right)$$

P) Given on going $\Delta P_{gasmeter(station)}$, $P_{gasmeter(station)}$, $T_{gasmixed}$, $Z_{gas}$, $SG_{gas}$, and station gas flow orifice meter opening area (i.e. $A_{orificestn}$), data is available to the HEMD (Note $Y_{orifice}$ and $C_{orifice}$ are based on the relationship of $A_{orificestn}$ to the cross-sectional area of the piping associated with the orifice meter and can be obtained from lookup tables). Then the actual natural gas flow rate through the compressor station ($Q_{gasstdstationactual}$) can be calculated as follows;

$$Q_{gasstdstationactual} = 1.2775 * Y_{orificestn} * C_{orificestn} * A_{orificestn} * \left[\left(\frac{\Delta P_{gasmeter(station)}}{SG_{gas} * z_{gas}}\right) * \left(\frac{P_{gasmeter(station)}}{P_{gasstd}}\right) * \left(\frac{T_{gasstd}}{T_{gasmixed}}\right)\right]^{0.5}$$

Q) Alternatively to Calculation "P", "R" or "S",, given on going $Q_{gasstdbypassactual}$ (from Calculation "H" or "I", as appropriate or "K") and $Q_{gasstdHEactual}$ (from Calculation "C" or "E") data is available to the HEMD, then the actual natural gas flow rate through the compressor station ($Q_{gasstdstationactual}$) can be calculated as follows;

$$Q_{gasstdstationactual} = Q_{gasstdbypassactual} + Q_{gasstdHEactual}$$

R) Alternatively to Calculation "P", "Q" or "S", given ongoing $Q_{gasstdHEactual}$ (from Calculation "C" or "E"), $T_{gasHEin}$, $T_{gasHEout}$, and $T_{gasmixed}$ data is available to the HEMD, then the actual natural gas flow rate through the heat exchanger ($Q_{gasstdstationactual}$) can be calculated by iteration, as follows;

$$Q_{gasstdstationactual} = Q_{gasstdHEactual} + \left( \frac{[Q_{gasstdstationactual} * T_{gasmixed}] - [Q_{gasstdHEactual} * T_{gasHEout}]}{T_{gasHEin}} \right)$$

S) Alternatively to Calculation "P", "Q" or "R", given ongoing $Q_{gasstdbypassactual}$ (from Calculation "H" or "I", as appropriate or "K"), $T_{gasHEin}$, $T_{gasHEout}$, and $T_{gasmixed}$ data is available to the HEMD, then the actual natural gas flow rate through the heat exchanger ($Q_{gasstdstationactual}$) can be calculated by iteration, as follows;

$$Q_{gasstdstationactual} = Q_{gasstdstationactual} - Q_{gasstdbypassactual} + \left( \frac{[Q_{gasstdstationactual} * T_{gasmixed}] - [(Q_{gasstdstationactual} - Q_{gasstdbypassactual}) * T_{gasHEout}]}{T_{gasHEin}} \right)$$

T) Given on going $P_{gasHEin}$, $T_{gasHEin}$, $Z_{gas}$, $SG_{gas}$, and $Q_{gasstdHEactual}$ (from Calculation "C", "D", "E" or "F") data is available to the HEMD and that $\Delta P_{gasHEorig}$, $P_{gasHEinorig}$, $T_{gasHEinorig}$, $Z_{gasorig}$, $SG_{gasorig}$, and $Q_{gasstdHEorig}$ has been previously recorded when 100% of the natural gas flow was diverted through the heat exchanger during the initial calibration/programming of the HEMD, then the expected pressure differential across the heat exchanger ($\Delta P_{gasHEexpect}$) can be calculated as follows;

$$\Delta P_{gasHEexpect} = \Delta P_{gasHEorig} * \left( \frac{Q_{gasstdHEactual}}{Q_{gasstdHEorig}} \right)^2 * \left( \frac{SG_{gas}}{SG_{gasorig}} \right) * \left( \frac{P_{gasHEinorig}}{P_{gasHEin}} \right) * \left( \frac{T_{gasHEin}}{T_{gasHEinorig}} \right) * \left( \frac{z_{gas}}{z_{gasorig}} \right)$$

U) Given on going $\Delta P_{gasHE}$ and $\Delta P_{gasHEexpect}$ (from Calculation "T") data is available to the HEMD, then the change in pressure differential across the heat exchanger ($\Delta P_{gasHEchange}$) can be calculated, as follows;

$$\Delta P_{gasHEchange} = \Delta P_{gasHE} - \Delta P_{gasHEexpect}$$

If $\Delta P_{gasHEchange} > 0$ (zero) then an increase in pressure differential across the heat exchanger has occurred. Conversely, if $\Delta P_{gasHEchange} < 0$ (zero) then a decrease in pressure differential has occurred. In any case the HEMD will then send either an open or close ($BV_{open}$ or $BV_{close}$) command signal to the heat exchanger bypass valve operator to adjust the bypass valve position ($BV_{position}$) and thereby adjust the natural gas flow through the exchanger in order to accommodate the new conditions and obtain the new optimum balance between gas cooling and heat exchanger pressure loss. The HEMD will record any increase in pressure differential across the heat exchanger ($\Delta P_{gasHEchange}$) and flag the incident for possible future maintenance action as the increase may be due to internal fouling of the exchanger tubes.

V) Given $T_{gasHEinorig}$, $T_{gasHEoutorig}$, $m\&_{gasHEorig}$, $c_{pgasorig}$, $A_{HEext}$, $F_{orig}$, and $LMTD_{orig}$ data is available to the HEMD after initial calibration/programming of the HEMD, then the actual original overall heat transfer coefficient ($U_{HEdirtyorig}$) with fouling resistance ($R_{fouling}$) (i.e. dirty) included can be calculated, as follows;

$$U_{HEdirtyorig} = \left( \frac{m\&_{gasHEorig} * c_{pgasorig}}{A_{HEext} * F_{orig} * LMTD_{orig}} \right) * (T_{gasHEinorig} - T_{gasHEoutorig})$$

W) Given on going $T_{gasHEin}$, $T_{gasHEout}$, $m\&_{gasHE}$, $c_{pgas}$, $A_{HEext}$, F, and LMTD, data is available to the HEMD, then the actual overall heat transfer coefficient ($U_{HEdirtyactual}$) with fouling resistance ($R_{fouling}$) (i.e. dirty) included can be calculated, as follows;

$$U_{HEdirtyactual} = \left( \frac{m\&_{gasHE} * c_{pgas}}{A_{HEext} * F * LMTD} \right) * (T_{gasHEin} - T_{gasHEout})$$

X) Given $d_{tube}$, $D_{tube}$, $k_{tube}$, $h_{gasorig}$ and $h_{airorig}$ data is available to the HEMD after initial calibration/programming of the HEMD, then the original overall heat transfer coefficient ($U_{HEcleanorig}$) with no fouling resistance ($R_{fouling}$) (i.e. clean) can be calculated, as follows;

$$U_{HEcleanorig} = \left[ 1000 * \left[ \left( \frac{1}{\frac{d_{tube}}{D_{tube}} * h_{gasorig}} \right) + \left( \frac{1}{2 * \frac{k_{tube}}{D_{tube}}} * \ln\frac{D_{tube}}{d_{tube}} \right) + \left( \frac{1}{h_{airorig}} \right) \right] \right]^{-1}$$

Y) Given on going $d_{tube}$, $D_{tube}$, $k_{tube}$, $h_{gas}$ and $h_{air}$ data is available to the HEMD, then the actual overall heat transfer coefficient ($U_{HEcleanactual}$) with no fouling resistance ($R_{fouling}$) (i.e. clean) can be calculated, as follows;

$$U_{HEcleanactual} = \left[ 1000 * \left[ \left( \frac{1}{\frac{d_{tube}}{D_{tube}} * h_{gas}} \right) + \left( \frac{1}{2 * \frac{k_{tube}}{D_{tube}}} * \ln\frac{D_{tube}}{d_{tube}} \right) + \left( \frac{1}{h_{air}} \right) \right] \right]^{-1}$$

Z) Given $U_{HEdirtyorig}$ and $U_{HEcleanorig}$ (from calculations "V" and "X" based upon the same natural gas mass flow rates through the heat exchanger) data is available to the HEMD, then the original fouling resistance ($R_{foulingorig}$) that has occurred in the heat exchanger can be calculated as follows;

$$R_{foulingorig} = \frac{1}{U_{HEdirtyorig}} - \frac{1}{U_{HEcleanorig}}$$

AA) Given on going $U_{HEdirtyactual}$ and $U_{HEcleanactual}$ (from calculations "W" and "Y" based upon the same natural gas mass flow rates through the heat exchanger) data is available to the HEMD, then the actual fouling resistance ($R_{foulingactual}$) that has occurred in the heat exchanger can be calculated as follows;

$$R_{foulingactual} = \frac{1}{U_{HEdirtyactual}} - \frac{1}{U_{HEcleanactual}}$$

BB) Given on going $R_{foulingorig}$ and $R_{foulingactual}$ (from calculations "Z" and "AA") data is available to the HEMD, then the actual change in fouling resistance ($R_{foulingchange}$) that has occurred in the heat exchanger can be calculated, as follows;

$$R_{foulingchange} = R_{foulingactual} - R_{foulingorig}$$

CC) Given on going $R_{foulingchange}$ (from calculation "BB") and $\Delta P_{gasHEchange}$ (from calculation "S") data is available to the HEMD, then it is possible to detect whether or not the difference in fouling resistance ($R_{fouling}$) is internal or external, as follows;

If in the first case $R_{foulingchange}<0$ (zero), then fouling has been removed from the heat exchanger tubes. If in the second case $R_{foulingchange}=0$ (zero) then no change has occurred in the fouling resistance of the heat exchanger tubes. If in the third case $R_{foulingchange}>0$ (zero) and $\Delta P_{gasHEchange}>0$ (zero) then an increase in internal fouling resistance of the heat exchanger tubes has occurred. If in the fourth case $R_{foulingchange}>0$ (zero) and $\Delta P_{gasHEchange}=0$ (zero) then an increase in external fouling resistance of the heat exchanger tubes has occurred. In the first case the ability of the heat exchanger to cool the natural gas has been enhanced. In the second and third cases the ability of the heat exchanger to cool the gas has been diminished. The HEMD will calculate and quantify the impact of the change in fouling resistance on the heat exchanger outlet gas temperature using some or all of the equations found in Paragraphs 17 to 32. The HEMD, will then send either an open or close ($BV_{open}$ or $BV_{close}$) command signal to the heat exchanger bypass valve operator to adjust the bypass valve position ($BV_{position}$) and thereby adjust the natural gas flow through the exchanger, in order to accommodate the new conditions and obtain the new optimum balance between gas cooling and heat exchanger pressure loss. The HEMD will record any increase in fouling resistance of the heat exchanger tubes ($\Delta R_{foulingchange}$) and flag the incident for possible future maintenance action.

DD) Given on going $T_{gasHEin}$ and $T_{gasHEout}$ data is available to the HEMD, then the temperature differential across the heat exchanger ($\Delta T_{gasHE}$) can be calculated as follows;

$$\Delta T_{gsHE} = T_{gasHEin} - T_{gasHEout}$$

EE) Given on going $T_{gasHEin}$ and $T_{airamb(HEin)}$ data is available to the HEMD, then the temperature differential between the hot heat exchanger inlet natural gas temperature and cool exchanger inlet air temperature ($\Delta T_{gas/air}$) can be calculated as follows;

$$\Delta T_{gas/air} = T_{gasHEin} - T_{airamb(HEin)}$$

FF) Given on going $\Delta P_{gasHE}$, $\Delta T_{gas/air}$, and $Q_{gasstdstation}$ data is available to the HEMD, the optimum heat exchanger pressure differential ($\Delta P_{gasHE(optimum)}$) and thereby bypass valve opening area ($A_{BVopen(optimum)}$) is determined by the control algorithm. The difference ($A_{BVopen(change)}$) between the optimum opening area and the current bypass valve opening area ($A_{BVopen(current)}$) can be calculated, as follows;

$$A_{BVopen(change)} = A_{BVopen(optimum)} - A_{BVopen(current)}$$

If $A_{BVopen(change)}>0$ (zero) then the HEMD will convert $A_{BVopen(change)}$ into the corresponding optimum heat exchanger bypass valve position ($BV_{position(optimum)}$). The HEMD will then send an open command signal ($BV_{open}$) to the heat exchanger bypass valve operator to open the bypass valve until the optimum opening position has been achieved. If $A_{BVopen(change)}<0$ then the HEMD will again convert $A_{BVopen(change)}$ into the corresponding optimum heat exchanger bypass valve position ($BV_{position(optimum)}$). The HEMD will then send a close command signal ($BV_{close}$) to the heat exchanger bypass valve operator to close the bypass valve until the optimum opening position has been achieved.

GG) Given $Q_{gasstdstationactual}$ (from outside sources), $Q_{gasstdstationest}$ (from Calculation "O") and $Q_{gasstdHEnest}$ (from Calculation "B"), then the actual natural gas flow rate through the heat exchanger ($Q_{gasstdHEactual}$) can be calculated, as follows;

$$Q_{gasstdHEactual} = Q_{gasstdHEest} * \left( \frac{Q_{gasstdstationactual}}{Q_{gasstdstationest}} \right)$$

The controller 46 is preferably operated to achieve optimum flow energy savings. This may be achieved by reference to the graphs of FIGS. 14 to 17, or their mathematical equivalent stored in a computer.

In FIGS. 14 and 15, the curves are based on a 30 MW compressor station with heat exchanger. The lower curve on this graph represents the incremental compressor power required to overcome the pressure loss associated with flowing gas through a heat exchanger. The far left of this curve indicates the maximum compressor power required to overcome the pressure loss associated with flowing all of the natural gas from the compressor through the heat exchanger. The right end of the curve shows that no compression power is required when there is no flow through the exchanger The upper curve depicts the power saving that results from transporting cooled natural gas through a pipeline, when all exchanger fans are operating, based on the cooling available for a typical Spring or Fall day. The upper curve drops off slowly because the amount of heat transferred (from the natural gas to the air in this case) is not directly proportional to the gas flow rate through the exchanger. For example when gas flow rate through the exchanger is reduced to one half the full gas flow rate, the amount of heat transfer equals approximately 78% of the full flow heat transfer (for an average sized mainline transmission heat exchanger) (see equations in Paragraphs 28 and 29). In this case although less natural gas is being cooled at the reduced flow rate, the gas is being cooled to a greater degree (i.e. closer to the ambient air temperature). The net effect is a non-proportional change in the amount of heat transferred with a reduction in gas flow rate through the exchanger, as depicted in this graph.

Upon comparison of the two curves it can be seen that the slope of the upper curve initially changes at a slower rate than that of the lower curve. It is this phenomena that provides the basis for optimizing exchanger performance. The difference between the two curves represents the net power saving from cooling the natural gas. For example 80% of the gas flow rate through the exchanger requires an extra 1400 kW of compressor power (to overcome exchanger pressure loss), but results in a (gross) savings of 2800 kW due to a lower pressure loss along the downstream pipeline (resulting from lower temperature inlet gas). This results in a net power saving of approximately 1400 kW.

As shown in FIG. 15, by comparing the two curves depicted in the graph of FIG. 14, it can be seen that the greatest net power saving occurs when approximately 50% of the natural gas flows through the exchanger (i.e. optimum gas flow rate occurs when approximately 50% of the gas flow rate bypasses the exchanger) and results in a net power saving of approximately 1750 kW.

Referring to FIG. 16, which is a graph showing incremental power saving curves based on the cooling available for an average winter, Spring or Fall, and Summer day and the incremental compressor power curve, the lower power saving curve represents the impact of the heat exchanger based on a Summer day. The greatest difference between this curve and the incremental compressor power curve occurs when approximately 34% of the natural gas flows through the exchanger (i.e. optimum gas flow rate occurs when approximately 66% of the gas flow rate bypasses the exchanger) and results in a net power saving of approximately 600 kW. The center curve is the same one depicted in FIG. 14 and is based on the cooling available for an average Spring or Fall day. As stated previously the greatest net power saving occurs when approximately 50% of the gas flows through the exchanger.

The upper curve represents the impact of the heat exchanger based on an average winter day. The greatest difference between this curve and the incremental compressor power curve occurs when approximately 60% of the natural gas flows through the exchanger (i.e. optimum gas flow rate occurs when approximately 40% of the gas flow rate bypasses the exchanger) and results in a net power saving of approximately 1950 kW.

Referring to FIG. 17, it can be seen that a relationship exists between the temperature differential between the heat exchanger inlet gas and ambient air (i.e. $\Delta T1$, $\Delta T2$ and $\Delta T3$) and the optimum gas flow rate through the exchanger. This in turn can be translated into a relationship between the temperature differential between the exchanger inlet gas and ambient air and the optimum heat exchanger gas pressure differential which is the basis for the heat exchanger control algorithm. This relationship is unique to every heat exchanger installation and is based upon numerous parameters including heat exchanger design (i.e. total cooling surface area, and number, configuration, length and diameter of the cooling tubes, and overall heat transfer coefficient), heat exchanger inlet gas temperature and pressure, ambient air temperature, the specific heat capacity of the natural gas and air, total gas flow rate from upstream compressor(s), maximum air flow rate through the exchanger, compressor performance and efficiency, downstream pipeline characteristics (i.e. pipe size, wall thickness, burial depth, etc.) and soil conductivity.

The net power saving resulting from optimizing natural gas flow rate through the exchanger results in a reduction in the power to gas throughput ratio and can improve the efficiency of a pipeline in one of two ways. The net power saving can either be utilized to move the same amount of gas through a pipeline with less compressor power or to move more gas through the pipeline with the same amount of power as is currently required. The reduction in the power to gas throughput ratio also results in a significant reduction in $CO_2$ emissions per given gas throughput.

The following nomenclature is used in the equations presented in this disclosure:

| Symbol | Description |
|---|---|
| $C_{pgas}$ = | specific heat capacity of natural gas at constant pressure, kJ/kg · °K |
| $C_{BV}$ = | heat exchanger bypass valve flow coefficient (from tables) |
| $C_{orifice}$ = | gas flow orifice meter coefficient (from tables) |
| °C. = | degrees Celsius (i.e. 0° C. = 273.15° K) |
| $Data_{in}$ = | data transfer into the HEMD (i.e. controller) |
| $Data_{out}$ = | data transfer out of the HEMD (i.e. controller) |
| $d_{pipe}$ = | inside pipe diameter, m |
| $d_{tube}$ = | heat exchanger cooling tube inside diameter, m |
| $D_{tube}$ = | heat exchanger cooling tube outside diameter, m |
| $\epsilon/d_{pipe}$ = | piping surface roughness, dimensionless |
| $f_{tube}$ = | D'Arcy friction factor of heat exchanger cooling tubes |
| F = | correction factor when using other than a counterflow double pipe type heat exchanger (i.e. for a cross flow type air cooled heat exchanger) |
| $h_{air}$ = | heat transfer coefficient of air, W/m² · °K |
| $h_{gas}$ = | heat transfer coefficient of natural gas, W/m² · °K |
| HEMD = | heat exchanger management device (i.e. controller) |
| °K = | degrees Kelvin (i.e. 0° C. = 273.15° K) |
| kg = | kilogram |
| kJ = | kilojoules (1000 Newton · meter) |
| km = | kilometer |
| kmol = | kilomole |
| kPa = | kiloPascals (1000 Newton/m²) |
| kW = | kilowatt (kilojoule/s) |
| $k_{adgas}$ = | adiabatic exponent of natural gas $c_{pgas}/c_{vgas}$ |
| $k_{air}$ = | thermal conductivity of air, W/m · °K |
| $k_{gas}$ = | thermal conductivity of natural gas, W/m · °K |
| $k_{tube}$ = | thermal conductivity of heat exchanger cooling tube, W/m · °K |
| $L_{pipe}$ = | length of pipeline, km |
| $L_{tube}$ = | length of heat exchanger cooling tubes, m |
| LMTD = | log mean temperature difference based on counterflow double pipe type heat exchanger, °K |
| m = | meter |
| $\dot{m}_{air}$ = | air mass flow rate, kg/s |
| $\dot{m}_{airHE}$ = | heat exchanger cooling air mass flow rate, kg/s |
| $\dot{m}_{gas}$ = | natural gas mass flow rate, kg/s |
| $\dot{m}_{gasHE}$ = | natural gas mass flow rate through heat exchanger, kg/s |
| $\dot{m}_{gascomp}$ = | natural gas mass flow rate through compressor, kg/s |
| $\dot{m}_{gaspipe}$ = | natural gas mass flow rate through pipeline, kg/s |
| MSC = | metric standard conditions (288.15° K (i.e. 15° C.) and 101.3 kPa) |
| $MW_{gas}$ = | natural gas molecular weight, kg/kmol |
| Newton = | force, kg · m/s² |
| $N_{HEtubes}$ = | number of cooling tubes in heat exchanger |
| $\eta_{ad}$ = | adiabatic compressor efficiency |
| $P_{airamb}$ = | ambient air pressure, kPa(a) |
| $P_{gasinlet}$ = | pipeline inlet natural gas pressure, kPa(a) |
| $P_{gasoutlet}$ = | pipeline outlet natural gas pressure, kPa(a) |
| $P_{gasstd}$ = | natural gas pressure at standard conditions, 101.325 kPa(a) |
| $P_{gascompdis}$ = | compressor discharge natural gas pressure, kPa(a) |
| $P_{gascompsuc}$ = | compressor suction natural gas pressure ($\cong P_{gas\ comp\ dis} - \Delta P_{gasHE}$), kPa(a) |
| $P_{gasHEin}$ = | heat exchanger inlet natural gas pressure, kPa(a) |
| $P_{gasmeter(station)}$ = | natural gas pressure at compressor station gas flow meter, kPa(a) |
| $\Delta P_{gasHE}$ = | natural gas pressure differential across heat exchanger (i.e. pressure loss), kPa |
| $\Delta P_{gasmeter(HE)}$ = | natural gas pressure differential across heat exchanger gas flow meter, kPa |
| $\Delta P_{gasmeter(station)}$ = | natural gas pressure differential across compressor station gas flow meter, kPa |
| $\Delta P_{gaspipe}$ = | natural gas pressure differential along a pipeline, kPa |
| $Pwr_{comp}$ = | compression power, kW |
| $\rho_{air}$ = | air density at standard conditions (288.15° K (i.e. 15° C.) and 101.3 kPa), 1.2255 kg/m³ |
| $\rho_{gas}$ = | natural gas density, kg/m³ |
| q = | heat (energy) transfer, kJ |
| $q_{air}$ = | heat (energy) transfer to air, kJ |
| $q_{gas}$ = | heat (energy) transfer to natural gas, kJ |
| $q_{HE}$ = | heat (energy) transfer by heat exchanger, kJ |
| $Q_{gasstdbypass}$ = | calculated flow rate of natural gas through heat exchanger bypass valve at MSC, m³/s |
| $Q_{gasstdHE}$ = | calculated flow rate of natural gas through heat exchanger at MSC, m³/s |

-continued

| | |
|---|---|
| $Q_{gasstdstation}$ = | calculated flow rate of natural gas through compressor station at MSC, m³/s. |
| R = | universal gas constant equals 8.314 kJ/kmol · °K |
| $R_{fouling}$ = | heat exchanger tube fouling resistance factor, m² · °K/kW |
| s = | second |
| $SG_{gas}$ = | specific gravity of natural gas |
| $T_{airamb(HEin)}$ = | ambient air temperature (i.e. heat exchanger air inlet temperature), °K |
| $T_{airHEout}$ = | heat exchanger outlet air temperature, °K |
| $T_{gascompdis}$ = | compressor discharge natural gas temperature, °K |
| $T_{gascompsuc}$ = | compressor suction natural gas temperature, °K |
| $T_{gasHEin}$ = | heat exchanger inlet natural gas temperature ($\cong T_{gascompdis}$), °K |
| $T_{gasHEout}$ = | heat exchanger outlet natural gas temperature, °K |
| $T_{gasinlet}$ = | pipeline inlet natural gas temperature, °K |
| $T_{gasmixed}$ = | natural gas temperature resulting from the mixture of the heat exchanger outlet gas ($T_{gasHEout}$) with the non-cooled bypass gas ($T_{gasHEin}$), °K |
| $T_{gasoutlet}$ = | pipeline outlet natural gas temperature, °K |
| $T_{gasstd}$ = | natural gas temperature at standard conditions, 288.15° K (15° C.) |
| $\Delta T_{gas/air}$ = | natural gas temperature differential between the heat exchanger inlet gas and ambient air, °K |
| $\Delta T_{gascomp}$ = | natural gas temperature differential between the compressor inlet and outlet gas, °K |
| $\Delta T_{gasHE}$ = | natural gas temperature differential between the heat exchanger inlet and outlet gas, °K |
| $U_{HE}$ = | overall heat transfer coefficient of heat exchanger, kW/m² · °K |
| $\mu_{air}$ = | dynamic viscosity of air, kg/m · s (Note 1 kg/m · s = 1000 Centipoise) |
| $\mu_{gas}$ = | dynamic viscosity of natural gas, kg/m · s (Note 1 kg/m · s = 1000 Centipoise) |
| W = | Watt |
| $Y_{BV}$ = | heat exchanger bypass valve net expansion factor (from tables) |
| $Y_{orifice}$ = | gas flow orifice meter net expansion factor (from tables) |
| $z_{gas}$ = | natural gas compressibility (calculated based upon gas components, pressure and temperature) |
| $z_{gascompdis}$ = | compressor discharge natural gas compressibility (calculated) |
| $z_{gascompsuc}$ = | compressor suction natural gas compressibility (calculated) |
| $z_{gasinlet}$ = | pipeline inlet natural gas compressibility (calculated) |
| $z_{gasoutlet}$ = | pipeline outlet natural gas compressibility (calculated) |

I claim:

1. A method for controlling gas cooling in a gas pipeline having a heat exchanger at a compressor station, the method comprising the steps of:
   A) obtaining observations of parameters that are characteristic of gas flow through the compressor station under a set of operating conditions having a corresponding energy cost, the observations comprising gas temperature at the inlet of the heat exchanger, gas temperature at the outlet of the heat exchanger, ambient air temperature and pressure, gas pressure at the inlet of the heat exchanger, gas pressure loss across the heat exchanger, estimated gas flow rate through the heat exchanger and periodic estimated gas flow through the heat exchanger bypass valve, and compressor station;
   B) from the observations of step A, determining a balance between gas cooling and heat exchanger gas pressure loss that results in an improvement of energy savings by comparison with the energy cost of the set of operating conditions; and C) operating a bypass valve on the gas pipeline to divert an amount of gas into the heat exchanger that achieves the balance determined in step B.

2. The method of claim 1 further comprising the steps of:
   finding the expected pressure differential across the heat exchanger at a level of gas flow rate;
   finding the actual pressure differential across the heat exchanger at a level of gas flow rate;
   finding a relationship between the actual pressure differential and expected pressure differential across the heat exchanger at the level of gas flow rate; and
   finding the degree of internal fouling of the heat exchanger from the relationship found in the preceding step.

3. The method of claim 2 further comprising the step of:
   adjusting the determination of step B for the gas flow rate through the heat exchanger.

4. The method of claim 2 further comprising the step of:
   recording the increase in pressure differential across the heat exchanger tubes for future maintenance action.

5. The method of claim 2 further comprising the steps of:
   finding a relationship between the original fouling resistance and actual current fouling resistance for the heat exchanger at level of cooling and gas flow rate; and
   finding the degree of internal and/or external fouling of the heat exchanger from the relationship found in the preceding step.

6. The method of claim 5 further comprising the step of:
   adjusting the determination of step B for the gas flow rate through the heat exchanger.

7. The method of claim 5 further comprising the step of:
   recording the increase in internal and/or external fouling of the heat exchanger tubes for future maintenance action.

8. The method of claim 1 further comprising the steps of:
   finding the original dirty overall heat transfer coefficient for the heat exchanger at a level of cooling and gas flow rate;
   finding the original clean overall heat transfer coefficient for the heat exchanger at a level of cooling and gas flow rate;
   finding a relationship between the original dirty and clean overall heat transfer coefficient at the level of cooling and gas flow rate; and
   finding the original fouling resistance for the heat exchanger from the relationship found in the preceding step.

9. The method of claim 1 further comprising the steps of:
   finding the actual current dirty overall heat transfer coefficient for the heat exchanger at a level of cooling and gas flow rate;
   finding the actual current clean overall heat transfer coefficient for the heat exchanger at a level of cooling and gas flow rate;
   finding a relationship between the actual current dirty and clean overall heat transfer coefficient at a level of cooling and gas flow rate; and
   finding the actual current fouling resistance for the heat exchanger from the relationship found in the preceding step.

10. The method of claim 1 in which the determination of step B takes into account compression power requirements in the pipeline downstream of the compressor.

* * * * *